(12) United States Patent
Basilier et al.

(10) Patent No.: US 10,299,199 B2
(45) Date of Patent: May 21, 2019

(54) METHOD AND CONTROL NODE FOR SELECTION OF A NETWORK PARTITION AND CORRESPONDING ROUTING OF A RECEIVED MESSAGE

(71) Applicant: TELEFONAKTIEBOLAGET LM ERICSSON (PUBL), Stockholm (SE)

(72) Inventors: Henrik Basilier, Täby (SE); Torbjörn Cagenius, Sollentuna (SE); Gunnar Mildh, Sollentuna (SE); Gunnar Nilsson, Lidingö (SE); Lennart Norell, Hägersten (SE); Stefan Rommer, Västra Frölunda (SE); Göran Rune, Linköping (SE); Ann-Christine Sander, Göteborg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/564,506

(22) PCT Filed: Apr. 8, 2016

(86) PCT No.: PCT/EP2016/057723
§ 371 (c)(1),
(2) Date: Oct. 5, 2017

(87) PCT Pub. No.: WO2016/162467
PCT Pub. Date: Oct. 13, 2016

(65) Prior Publication Data
US 2018/0077637 A1    Mar. 15, 2018

Related U.S. Application Data

(60) Provisional application No. 62/144,762, filed on Apr. 8, 2015.

(51) Int. Cl.
*H04W 72/00*    (2009.01)
*H04W 48/18*    (2009.01)
(Continued)

(52) U.S. Cl.
CPC .............. *H04W 48/18* (2013.01); *H04W 4/70* (2018.02); *H04W 8/26* (2013.01); *H04W 76/27* (2018.02); *H04W 84/042* (2013.01)

(58) Field of Classification Search
None
See application file for complete search history.

(56) References Cited

U.S. PATENT DOCUMENTS

2011/0207428 A1    8/2011    Ueda et al.
2016/0360476 A1*   12/2016   Kim ...................... H04W 48/16

OTHER PUBLICATIONS

International Search Report and Written Opinion issued in International Application No. PCT/EP2016/057723, dated Jul. 8, 2016, 16 pages.

(Continued)

*Primary Examiner* — Erika A Washington
(74) *Attorney, Agent, or Firm* — Rothwell, Figg, Ernst & Manbeck, p.c.

(57) ABSTRACT

A method implemented in a control node includes receiving a message from a first node. The method further includes determining whether the received message corresponds to one or more network partitions based at least in part on the partition selection information. The method further includes selecting, in response to determining that the message corresponds to the one or more network partitions, a particular network partition from the one or more network partitions using the partition selection information, and routing the message to a second node associated with the selected particular network partition.

34 Claims, 17 Drawing Sheets

(51) Int. Cl.
  *H04W 8/26* (2009.01)
  *H04W 4/70* (2018.01)
  *H04W 76/27* (2018.01)
  *H04W 84/04* (2009.01)

(56) References Cited

OTHER PUBLICATIONS

Alcatel-Lucent, A. et al., 3GPP TSG RAN3 3GHNB Adhoc Meeting, R3-082881, "UE Registration & Context Id allocation", Austria, Vienna, Oct. 21-22, 2008, 3 pages.
Ericsson, 3GPP TSG-SA WG1 Meeting #70, S1-151181, "SMARTER: Network slicing to cater for diverse use cases", Los Cabos, Mexico, Apr. 13-17, 2015, 3 pages.

\* cited by examiner

METHOD AND CONTROL NODE FOR SELECTION OF A NETWORK PARTITION AND CORRESPONDING ROUTING OF A RECEIVED MESSAGE

CROSS REFERENCE TO RELATED APPLICATION(S)

This application is a 35 U.S.C. § 371 National Stage of International Patent Application No. PCT/EP2016/057723, filed Apr. 8, 2016, designating the United States and claiming priority to U.S. provisional application no. 62/144,762, filed on Apr. 8, 2015. The above identified applications are incorporated by reference.

TECHNICAL FIELD

This disclosure relates generally to providing new solutions for supporting optimized network functionality with respect to new use cases in existing and future networks, more particularly, to methods and device for selection of a network partition.

BACKGROUND

Existing networks (e.g., 2G, 3G, 4G, WLAN etc., and evolution thereof) and future Radio Access and Core Networks (5G, 6G, etc.) require solutions for supporting optimized network functionality for addressing new use cases for cellular technologies.

Evolved Packet System (EPS) is the Evolved 3GPP Packet Switched Domain and consists of Evolved Packet Core (EPC) and Evolved Universal Terrestrial Radio Access Network (E-UTRAN). EPS also supports packet switched access over GSM/EDGE Radio Access (GERA), Universal Terrestrial Radio Access (UTRA) and Wireless Local Area Network (WLAN).

FIG. 1 illustrates an example EPC architecture for 3GPP accesses (GERAN, UTRAN and E-UTRAN), which includes, for example, a PGW (PDN Gateway), SGW (Serving Gateway), PCRF (Policy and Charging Rules Function), MME (Mobility Management Entity), HSS (Home Subscriber Service) and mobile device (UE). The LTE radio access, E-UTRAN, consists of one more eNBs. FIG. 1 illustrates the architecture for 3GPP accesses. In these types of accesses, the radio interface is specified by 3GPP (e.g., E-UTRA).

FIG. 2 illustrates an example E-UTRAN architecture. The E-UTRAN consists of eNBs, providing the E-UTRA user plane (PDCP/RLC/MAC/PHY) and control plane (RRC) protocol terminations towards the UE. The eNBs are interconnected with each other by means of the X2 interface. The eNBs are also connected by means of the S1 interface to the EPC (Evolved Packet Core), more specifically to the MME (Mobility Management Entity) by means of the S1-MME interface and to the Serving Gateway (S-GW) by means of the S1-U interface.

FIG. 3 illustrates an example EPC Control Plane (CP) protocol architecture. The EPC CP protocol architecture consists of various layers (physical, MAC, RLC, PDCP, RRC and NAS) for the UE, eNB, MME, SGW and PGW network components.

FIG. 4 illustrates an example EPC User Plane (UP) protocol architecture. The EPC UP protocol architecture consists of various layers (physical, MAC, RLC, PDCP, IP and application) for the UE, eNB, SGW and PGW network components.

Future networks are expected to support new use cases going beyond the basic support for voice services and mobile broadband (MBB) currently supported by existing cellular networks (e.g., 2G/3G/4G). An example new use case includes evolution of MBB including evolved communication services, cloud services, and extended mobility and coverage. Another example new use case includes mission critical machine type communication including intelligent traffic systems, smart grid, and industrial applications. Another example new use case includes massive machine type communication including sensors/actuators and capillary networks. Another example new use case includes Media including efficient on-demand media delivery, media awareness, and efficient support for broadcast services.

These use cases are expected to have different performance requirements (e.g., bit-rates, latencies, mobility, availability etc.) as well as other network requirements affecting the network architecture and protocols. Supporting these new use cases may require that new players and business relations are needed compared to existing cellular technologies. For example, it is expected that future networks should address the needs of enterprise services, governments services (e.g., national safety, verticals industries (e.g., industry automation, transportation), and residential users. These different users and services are also expected to place new requirements on the network.

Accordingly, it is expected that new services with a wide range of heterogeneous requirements need to be supported. There is a need to be able to support these new services in a cost efficient way using common network infrastructure (e.g., radio, transport, networking, processing, and storage) and functional components (e.g., mobility manager) applied to specific business segments (e.g., verticals with specific requirements), while still making it possible to optimize the network when it comes to deployment, functionality needed, scalability, etc. for these new services. Additionally, it is desired by one of ordinary skill in the art to provide isolation between the different business segments of the common network infrastructure to prevent one user associated with one or more services from causing problems to other users and services.

The capabilities of existing networks and standards to provide the above-described isolation and optimization are limited. For example, all users must be connected to the same MBB core network within on PLMN. In another example, while it is possible to use Access Point (AP) names to perform partitioning higher up in the core network, the lower parts (MEE, SGW) of the network are left with no options of isolation, resource reservations or per service/segment or optimization. In yet another example, while it is possible to share the RAN between multiple PLMNs, a particular PLMN cannot be further partitioned.

In some 3GPP solutions, one (or more) dedicated core networks (DÉCOR) (also referred to as "network partitions" or "slices") within a PLMN with each core network dedicated for a specific type(s) of subscriber may add the possibility to re-route an attach message to a separate MBB partition. However, this 3GPP solution is limited to the use of UMTS AKA authentication and requires that the base slice provides a MME that can do the authentication and use the information from the HSS to select the partition for rerouting. In that regard, the user must be defined in the operator HSS (for both partitions) and is a limitation when providing an enterprise specific partition since the enterprise needs to be able to manage user data via the operator. Moreover, to the extent that some network components, such as the MME and HSS are commonly relied on, the ability to provide resource reservation/guarantees for a partition and the ability to provide isolation from a security/integrity point-of-view are limited. Further, having to rely on common network infrastructure component may also complicate functionality both technically and from an operation perspective, which may lead to longer lead time for new services and for the activation of new customers (e.g., wholesale). Additionally, redirection is limited in that extra signaling is involved, which may cause delays, load, and potential issues in recovery situations (e.g., when many UEs reconnect and all of the UEs need to be redirected).

Thus, there is a need for a solution that allows the use of alternative authentication mechanisms without the need to use data in the operator's network (e.g., user data handled by an enterprise customer, but used to authorize access into a particular network partition).

SUMMARY

According to some embodiments, a method implemented in a control node includes receiving a message from a first node, the message including partition information. The method further includes determining whether the received message corresponds to one or more network partitions based at least in part on the partition selection information. The method further includes selecting, in response to determining that the message corresponds to the one or more network partitions, a particular network partition from the one or more network partitions using the partition selection information, and routing the message to a second node associated with the selected particular network partition.

In some embodiments, a method implemented in a control node includes receiving a message from a first node, the message including partition selection information. The method further includes determining whether the received message corresponds to one or more network partitions based at least in part on the partition selection information. The method further includes selecting a service network serving one or more network partitions using the partition selection information, and routing the message to the selected service node.

According to some embodiments, a control node includes one or more processors and a non-transitory computer readable medium coupled to the one or more processors. The non-transitory computer readable medium contains instructions executable by the one or more processors. The control node is operative to receive a message from a first node, the message including partition selection information. The control node is further operative to determine whether the received message corresponds to one or more network partitions based at least in part on the partition selection information. The control node is further operative to select, in response to the determination that the message corresponds to the one or more network partitions, a particular network partition from the one or more network partitions using the partition selection information, and further operative to route the message to a second node associated with the selected particular network partition.

According to some embodiments, a control node includes one or more processors and a non-transitory computer readable medium coupled to the one or more processors. The non-transitory computer readable medium contains instructions executable by the one or more processors. The control node is operative to receive a message from a first node, the message including partition selection information. The control node is further operative to determine whether the received message corresponds to one or more network partitions based at least in part on the partition selection information. The control node is further operative to select a service network configured to serve one or more network partitions using the partition selection information, and further operative to route the message to the selected service node.

BRIEF DESCRIPTION OF THE DRAWINGS

The accompanying drawings, which are incorporated herein and form part of the specification, illustrate various embodiments of the present disclosure and, together with the description, further serve to explain the principles of the disclosure and to enable a person skilled in the pertinent art to make and use the embodiments disclosed herein. In the drawings, like reference numbers indicate identical or functionally similar elements.

DETAILED DESCRIPTION

Figure 1:
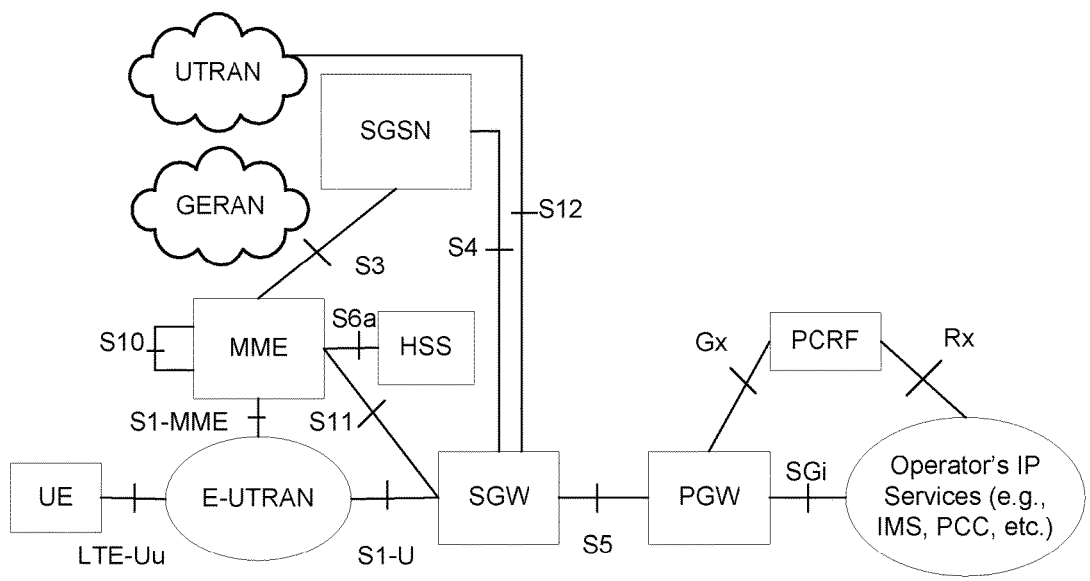
FIG. 1 is an illustration of an EPC architecture for 3GPP accesses.
Figure 2:
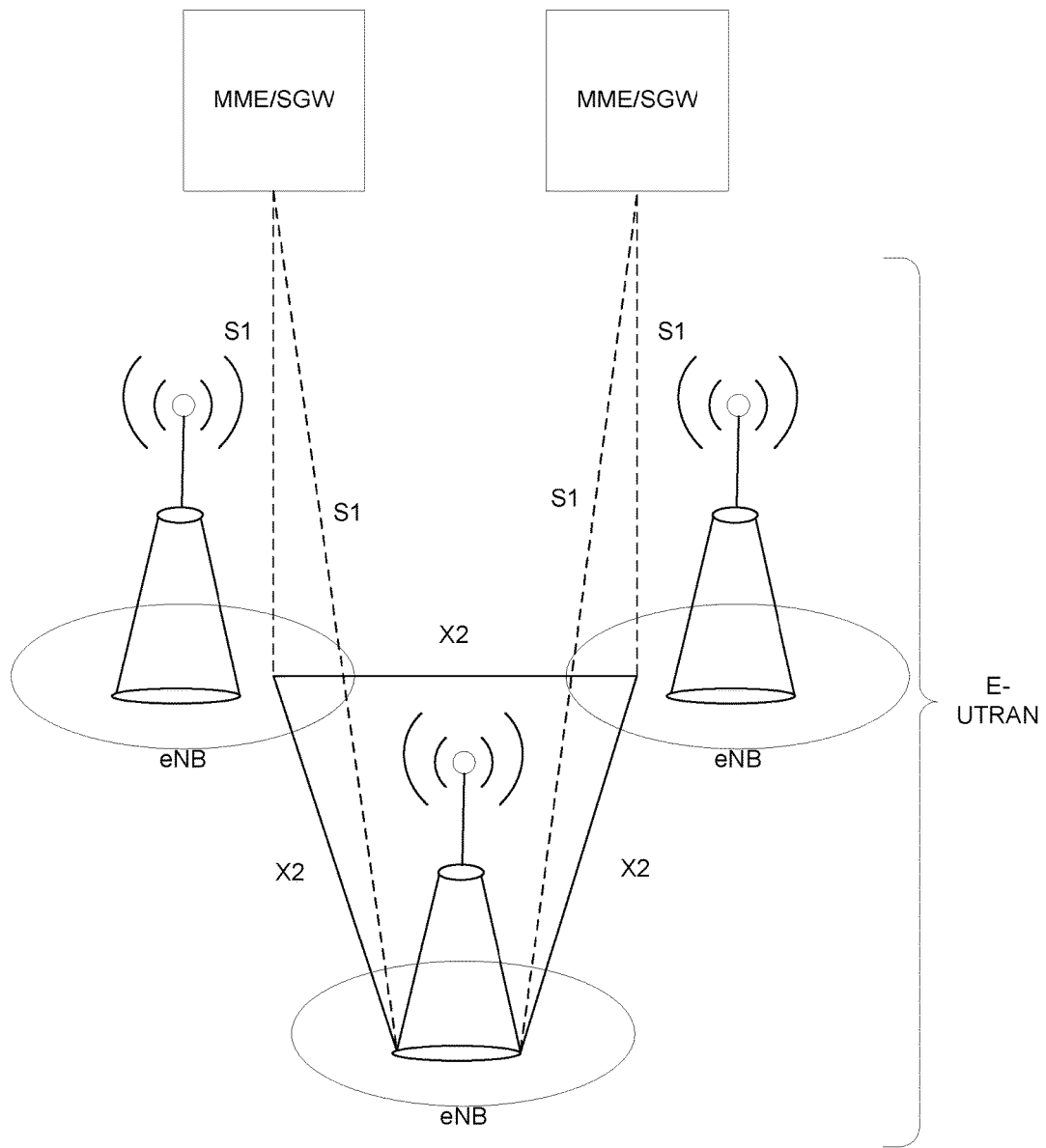
FIG. 2 is an illustration of an E-UTRAN architecture.
Figure 3:
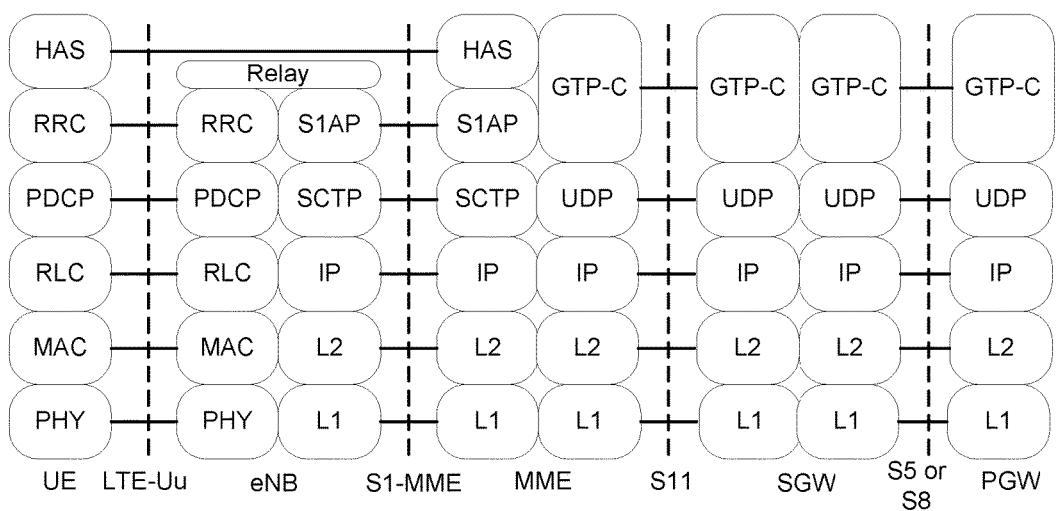
FIG. 3 is an illustration of an EPC Control Plane (CP) protocol architecture.
Figure 4:
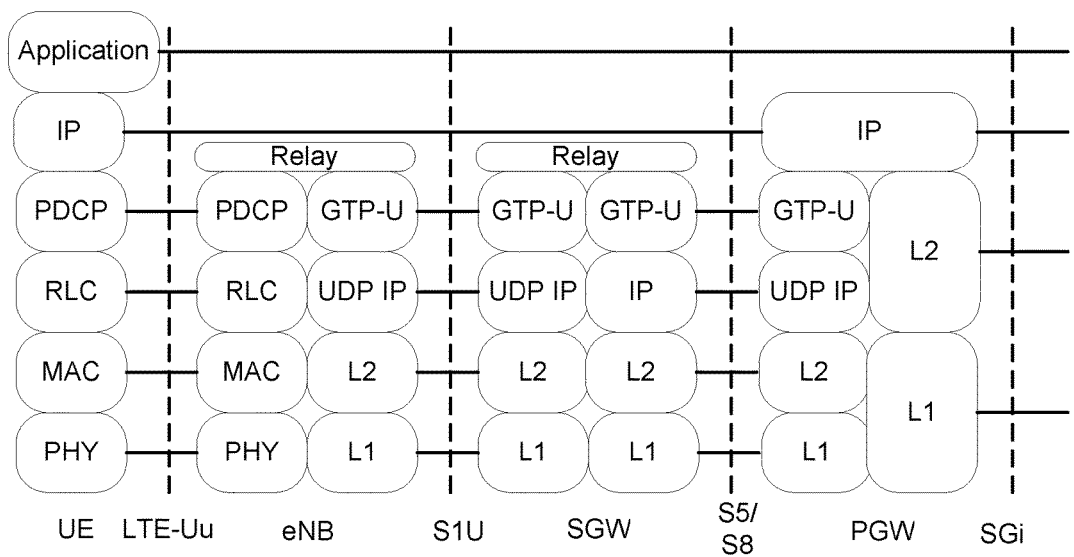
FIG. 4 is an illustration of an EPC User Plane (UP) protocol architecture.

Embodiments are directed to receiving and directing an initial signal (or message) from a wireless communication device (e.g., UE) to a defined network partition based on extra information included in the initial signal. The initial message, for example, may be an initial UE attach message or a Radio Resource Control (RRC) connection message. The directing of the initial message may be performed by a partition selection function of a network, such as a control node. In that regard, the initial message can be directed to the defined network partition using the already existing network and without the need to use any user specific data in the operator network.

The extra information in the initial message may be preconfigured into the wireless communication device and/or may be provisioned into the wireless communication "over the air." A UE, for instance, may selectively include the extra information in the initial message based on one or more notifications (e.g., broadcast messages) it may receive. By way of example, a notification may indicate that the extra information is accepted in a network area. In another example, the notification may indicate which types of extra information are acceptable in the network area, which may indirectly indicate which network partitions are available.

Further, in one embodiment, the extra information in the initial message may be part of a RAN signal. In another embodiment, the extra information may be encapsulated into a NAS signaling message to the core network and/or added in an encapsulation layer associated with the NAS message. In a further embodiment, some of the extra information may be included in the RAN signal and some of the extra information in the NAS signaling message.

As noted above, the partition selection function may be a control node in the network that is configured to direct the initial message from the wireless communication device to an appropriate network partition. The partition selection function may exist as a separate entity and/or may be located in the RAN. In one embodiment, for example, the EPC may be considered as the "default" network partition such that the RAN directs the initial message to an MME of the EPC. Thus, in this scenario, a control node in the RAN is the partition selection function. In the same example, however, when the initial message contains information associated with a special network partition, a separate entity, such as an extended partition selection function (which may also be a control node) may be invoked to direct the message to the special network partition. Thus, depending on the information contained in the message, the routing of the message to a network partition may be performed by different control nodes (e.g., a partition selection in the RAN, a separate extended partition selection function). In that regard, it is possible that the "partition selection function" can be effectively "split up" between the RAN and the extended partition selection function.

The partition selection function uses the extra information in the initial message to determine which partition, if any, the message is to be directed or routed. If the extra information is included in an encapsulation layer encapsulating a NAS signaling message, the encapsulation may terminate in the partition selection function and consequently the NAS signaling message is de-capsulated before being passed on to the core network.

The extra information (or the partition selection information) may include various types of information so that the partition selection function can select an appropriate network partition. For example, the partition selection information may include a well-known identification (ID) of a type of partition, such as Mobile Broadband (MBB), Machine Type Communication (MTC), or media distribution. Further, the partition selection information may include a unique ID of a target network partition. By way of example, the unique ID may be unique just to that network partition. Moreover, the partition selection information may include an ID of a type of network terminal or describe one or more characteristics of the same such that the partition selection function may choose an appropriate network partition to handle the wireless communication device, which may for instance a type of sensor. Furthermore, in some embodiments, the extra information may include an "escape" code that signals to a node in the RAN that a separate extended partition selection function needs to be invoked in order to select the appropriate network partition. The extra information may not be limited to the partition ID, and may also include other types of information, such as a special PLMN ID.

There may be instances where information associated with unique network partitions may not be available. For example, when a wireless communication device, such as a UE, is roaming. In that regard, the partition selection information can include information about a network serving one or more network partitions, such as a home service network or an enterprise network, that may be used by the partition selection function. This can facilitate routing the initial message to the network without necessarily knowing all the unique partitions served by the network.

The selection of a network partition is made at initial attachment of a UE with the network. At subsequent signaling, the wireless communication device may indicate either only a target node, indirectly mapping to the network partition (retrieved at initial attach) or a combination of a partition ID and a target node ID which uniquely maps to the appropriate network partition and target node, even if the target nodes are not unique globally. Another example would be that the network partition ID is coded into the target node ID, where several bits, for instance, are used to identify the network partition.

As an additional option to performing network partition selection only at initial attach, partition selection could be done both at initial attach and during a tracking area update into a new tracking area. Consequently, the subsequent signaling behavior described above would not apply to the tracking area update into a new tracking area. Thus, for the tracking area update into a new tracking area, the same behavior at initial attach applies.

Figure 5:
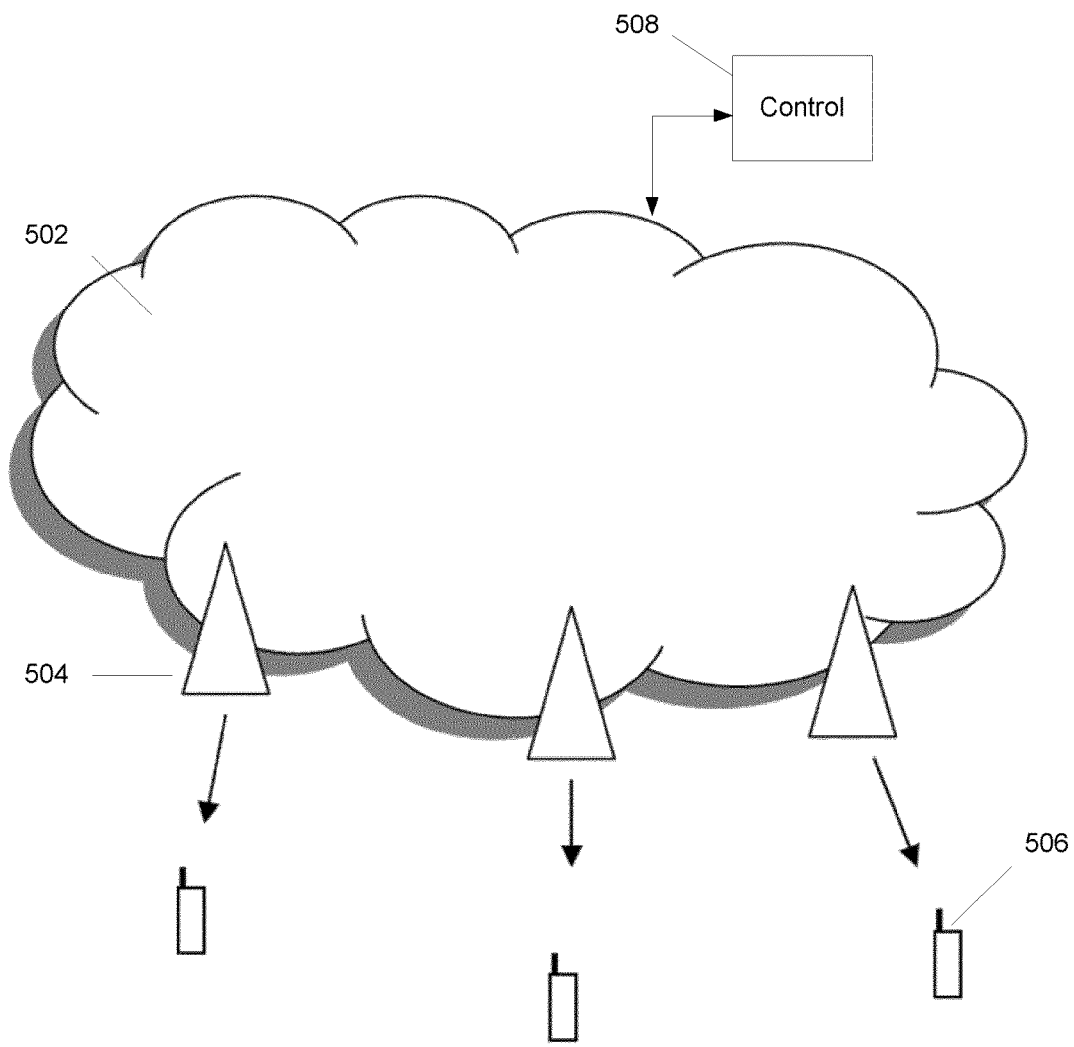
FIG. 5 is an illustration of an exemplary wireless communication system in accordance with exemplary embodiments.

Referring now to FIG. 5, a wireless communication deployment 500 in accordance with exemplary embodiments includes an access node 504 serving a wireless communication device (WCD) 506. Examples of WCDs include, but are not limited to, mobile telephones, user equipments (UEs), personal digital assistants, electronic readers, portable electronic tablets, wireless sensors, machine communication devices, personal computers, and laptop computers. Furthermore, the wireless communication device 506 may be a legacy UE or dynamic TDD capable UE. Access node 504 may be, for example, a base station, an eNodeB, relay node, or gateway type device, and is capable of communicating with device 506, along with any additional elements suitable to support wireless communication between wireless communication devices or between a wireless communication device and another communication device, such as landline telephone. The access node 504 may be in communication with, for instance via a network 502, one or more control nodes 508, such as a Radio Network Controller (RNC), a Mobility Management Entity (MME), a Mobile Switching Center (MSC), Base Station (BS), Base Station Subsystem (BSS), a router, or any node that is configured to control various aspects of communication. Although node 508 is explicitly identified as a control node, each of nodes 504, 506, and 508 may be understood as a "control" node to the extent that it includes a control unit or otherwise implements control functions. Further, it should be understood that the one or more control nodes or nodes 504, 506, 508 that act as a controller are not limited to specific locations in a network and/or a network system. For instance, a control node may be a node in the RAN or may be a node outside the RAN.

Figure 6:
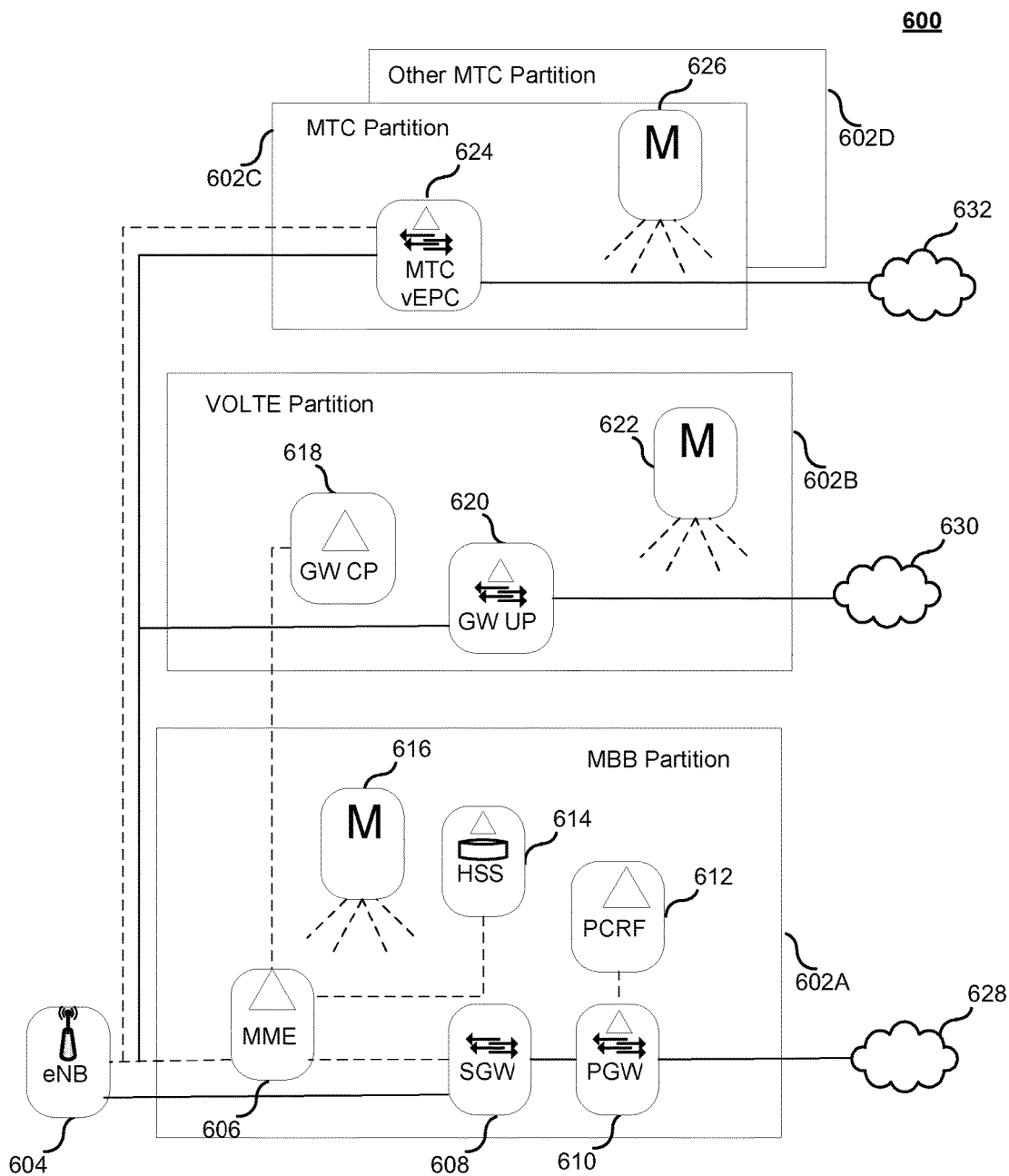
FIG. 6 is an illustration of network partitioning in accordance with exemplary embodiments.

FIG. 6 illustrates an embodiment of network partitioning, where the EPC is divided into several different parts also called slices, where different network partitions support different services and handles different users. The actual functional components of the different network partitions may be supported on the same infrastructure (e.g., when using Network Functional Virtualization NFV) or the components can use different hardware.

FIG. 6 illustrates an example EPC network with an MBB partition (602A) connected to cloud 628, a Voice over LTE (VoLTE) partition (602B) connected to cloud 630, a first Machine-Type (MTC) partition (602C), and a second MTC partition (602D) each connected to cloud 632. As illustrated in FIG. 6, each of the partitions is in communication with an eNB 604. The MBB partition 602(a) includes, for example, a MME 606, a SGW 608, a PGW 610, a Policy Control Rules Function (PCRF) 612, a Home Subscriber Server (HSS) 614, and an operation support systems (OSS) node 616. The VoLTE partition 602B includes, for example, gateways 618 and 620 and OSS node 622. The first MTC partition 602C includes, for example, an MTC node 624 that facilitates communication between eNB 604 and network 632. The first MTC partition 502C further includes OSS node 626. The second MTC partition 502D may include a similar group of nodes as the first MTC partition 502C.

According to some embodiments, network partitioning may be deployed in several different layers of the network. Partitioning between the RAN and EPC assumes a common RAN and radio interface supporting several different EPC partitions. Other possible places to deploy network partitioning includes between S-GW and PDN GW, or between network layer and service layer (e.g. IMS). While the embodiment described herein may use current EPC terminology, it should be understood that the descriptions are application to future releases/generations of corresponding core networks (e.g., 5G, 6G, etc.).

There may be various reasons/motivations for implementing and/or supporting network partitioning. For instance, these reasons/motivations may include: the optimized use of resources which are separately configurable; being able to implement a "toolbox" architecture where each partition can be configured for a particular purpose instead of "one size fits all" architecture; faster setup for certain types of network messaging (e.g., TTM) if separately managed and limited impact on other network partitions; allowing enterprises or other verticals to impact, configure, and/or monitor their respective partition(s); allowing for smooth migration, by enabling new service in new partitions while maintaining and evolving existing services in existing partitions; allows for re-use of functionality developed for one use case and one partition for other use cases and partitions, while still allowing for isolation and individual configurability (e.g., using the same security or mobility configurations); and allowing different functional composition in different slices (e.g., one slice may not have mobility and another slice may not use a unique security mechanism).

The concept of deploying one or more network partitions of an EPC makes it possible to support common RAN solutions for the different network partitions.

There are several potential purposes for supporting network partitioning. For instance, the operator can support a default network partition for handling the most common use cases, such as mobile broadband and use network partitioning to support instances where: (i) there is a need to optimize or support a specific network capability, such as short latency (RTT), high reliability, additional functionality (e.g., non-SIM based security); (ii) the operator wants to provide an "as a Service" (aaS) (e.g., Voice over LTE); and (iii) the operator wants to isolate some network traffic from a default network partition for instances like trial services for a limited set of trial users, SW upgrade, security isolation of known devices that may be insecure, etc.

In some embodiments, a common base architecture supports the network partitions of the network. As an example, a common base architecture may include a common RAN architecture and RAN interface (radio, S1 interface etc.). Furthermore, in some embodiments, the network includes mechanisms for network partition selection including how the UE is assigned to a specific network partition at initial connection.

There may be various example use cases of network partitioning. According to some embodiments, MBB services may be supported using a default network partition, and also support a large number of MTC devices such as sensors, actuators, etc., in a separate partition, which, for instance, is optimized to handle a large number of wireless devices associated with low bit-rate communication and services. In other embodiments, a particular network partition may handle critical MTC communications (e.g., communications from an autonomous vehicle), which may be configure to be optimized for low latency and high availability services. For example, this particular network may deploy packet core function closer to the radio node in order to minimize any latency.

Network partitioning may support any combination of the following use cases: Mobile Broadband (MBB) (e.g., "normal" MBB, extreme mobile broadband, distributed MBB, MBB with Wi-Fi calling (untrusted access), Wi-Fi included in MBB (untrusted access), Wi-Fi included in MBB (trusted access), broadband access for user in crowd, MBB in vehicles, etc.); Massive MTC (e.g., basic machine-to-machine, massive low-cost/long-range/low-power MTC, etc.); Mission Critical MTC (e.g., ultra-high reliability, and/or ultra-low latency, industry automation, traffic safety control, etc.); Efficient Media Distribution; Partitions and Sub-Partition aaS (e.g., VoLTE aaS, MTC aaS (massive or mission critical), virtual enterprise/enterprise services, MVNO aaS, etc.); Operational Use Cases (e.g., SW upgrade, trials, etc.).

According to some embodiments, a network partition is a (logical) partition of the network, used, e.g., for resource allocation, isolation, operational efficiencies, optimization, business relevance or to improve TTM/TTC. The network partition may include a group of nodes logically associated with the partition.

In some embodiments, a base partition is the first network partition to which the UE connects and is responsible for authenticating the UE towards the network. Different UEs could be associated with different Base Partitions. In some embodiments, a resource instance is a physical or virtual resource used as a building block for network partitions, which can be dedicated or shared amongst network partitions.

In some embodiments, a resource instance is a physical or virtual resource used as a building block for network partitions, which may be dedicated or shared among the network partitions.

According to some embodiments, in EPC network partitioning, (i) the interface between the RAN and CN can be common for all network partitions and can be based on the S1 interface between E-UTRAN and EPC; (ii) one base partition can connect to more than one RAN, thus, providing RAN mobility functionality inside the Base Partition; (iii) one RAN can connect to more than one base partition; (iv) the base partition selected for the UE may be verified through subscription data; (v) network partitioning is applicable for any cellular access (2G/3G/4G/5G etc. and for Wi-Fi); (vi) it is not required that a UE must re-attach to a partition upon moving between partitions; and (vii) both virtualized and non-virtualized environments are supported. In the virtual environment, a network node may be a single network node or have its functionality distributed over a number of nodes. For example, a network control node may be implemented on a single node or distributed over a plurality of nodes. In some embodiments, the network node may be a software component running in a virtualized environment.

An aspect in allowing the core network to be divided into network partitions that serve different use cases and/or users is how traffic from the RAN is distributed to the appropriate network partitions. The distribution may be divided into two phases: (i) a base partition selection that may be used to route or steer an initial attach message of a wireless communication device via the RAN to an appropriate base network partition; and (ii) subsequent signaling from the device, which may be based on the device storing the identity of the network partition and/or a specific node in the network partition.

The concept of base partition selection is significantly advantageous compared to existing attach procedures. The subsequent signaling once a base partition is selected may be done in the same manner as described in existing standards (such as the GUMMEI identity used in LTE standards), with the additional option that partition ID may include non-globally unique target node IDs or to otherwise simplify various network procedures. In that regard, network partition selection may be performed on already existing network infrastructures and without the need to use any user specific data in the operator network. While there exists a mechanism to direct an attach request message to the EPC of different operators used in RAN sharing between the operators, it is limited and requires that the PLMN identifications (IDs) are broadcasted in the RAN such that the device can indicate to which of the broadcasted PLMN IDs it is attempting to attach.

In some embodiments, base partition selection can be performed both at initial attach and Tracking Area Update into a new tracking area. Thus, the above-described subsequent signaling behavior would not apply to the Tracking Area Update into a new tracking area, and further, the same behavior as at the initial attach applies to the Tracking Area Update into a new tracking area.

Figure 7:
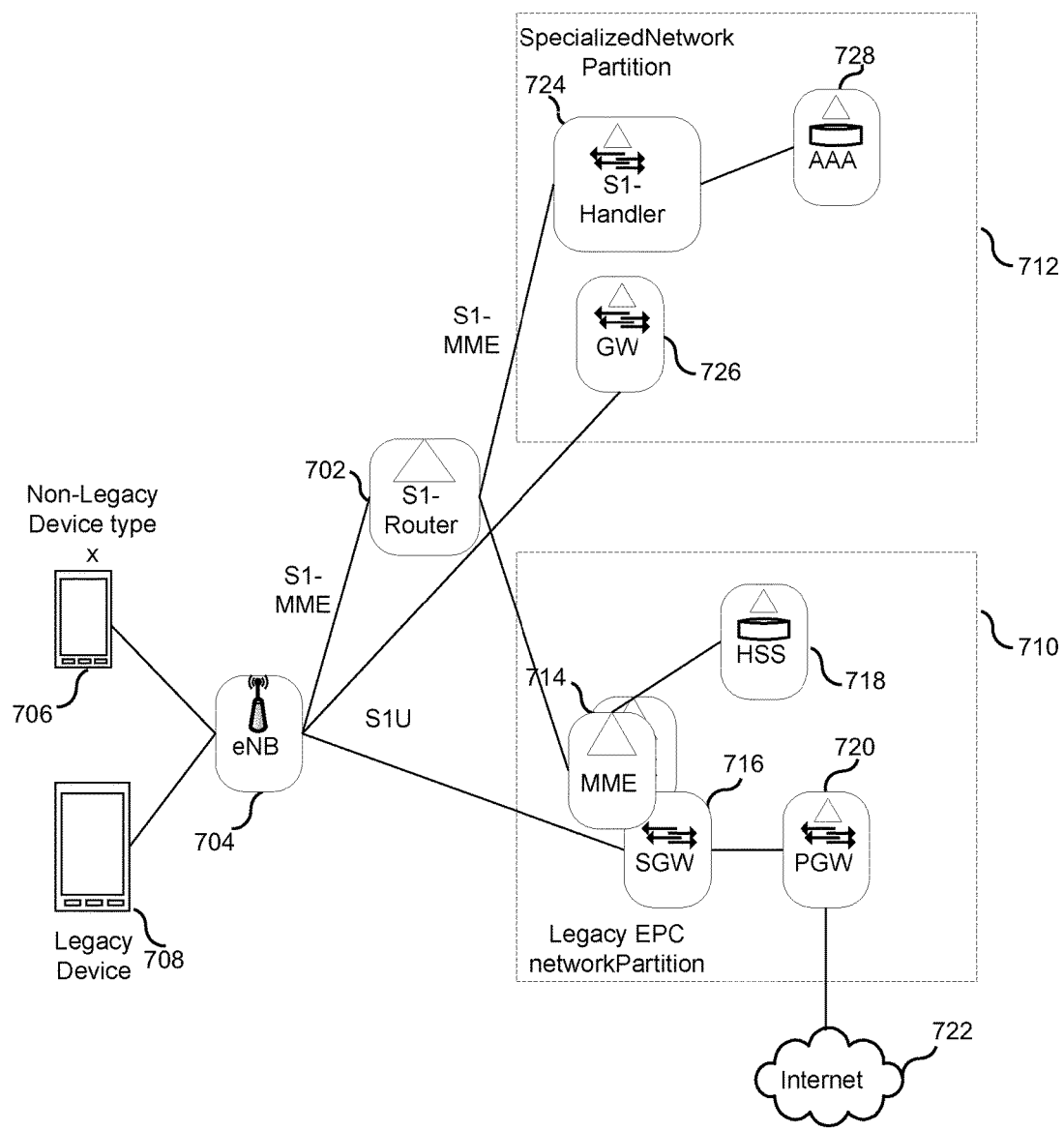
FIGS. 7-10 are exemplary illustrations of a partition selection function arranged in a network in accordance with exemplary embodiments.
Figure 8:
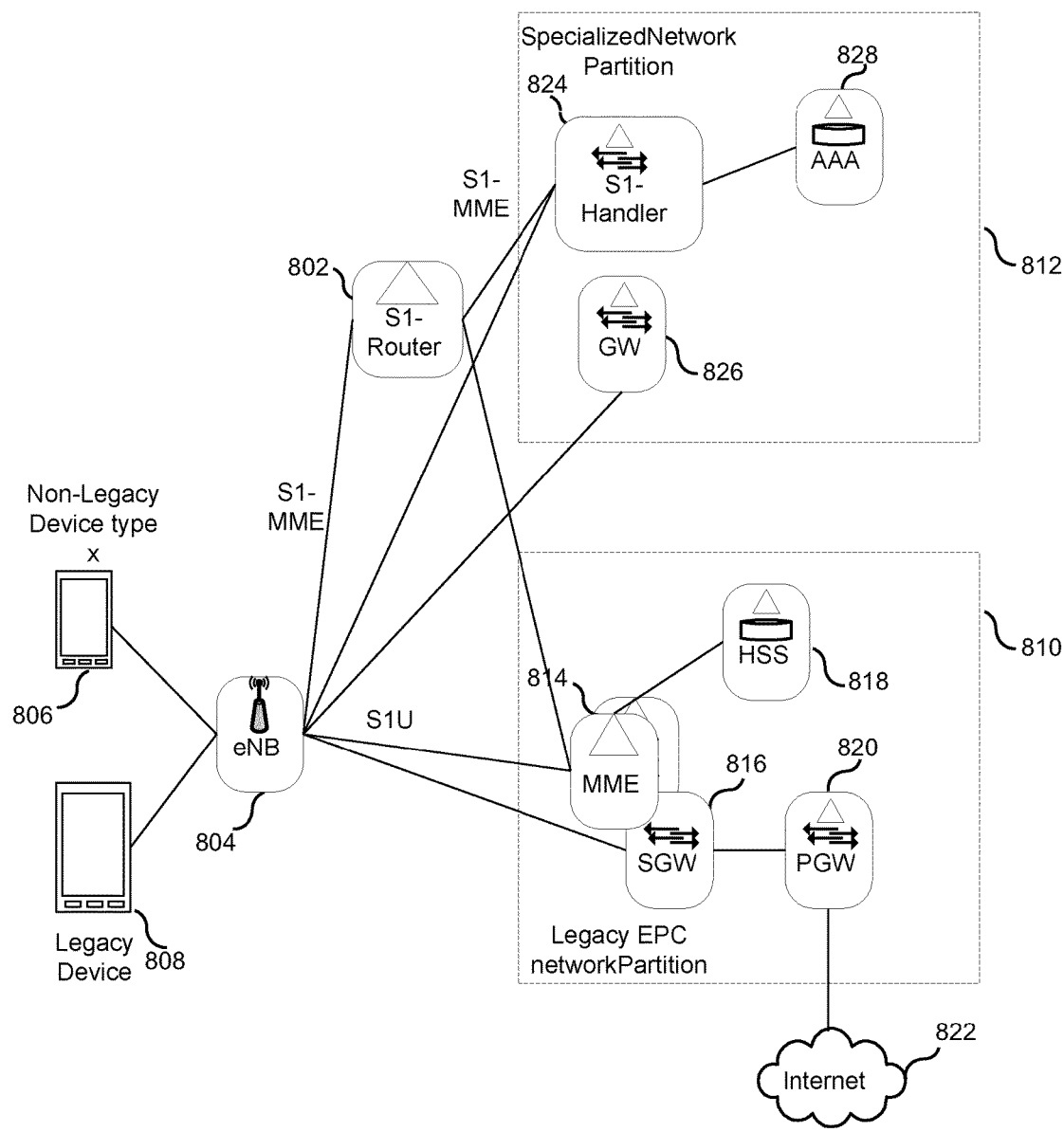
Figure 9:
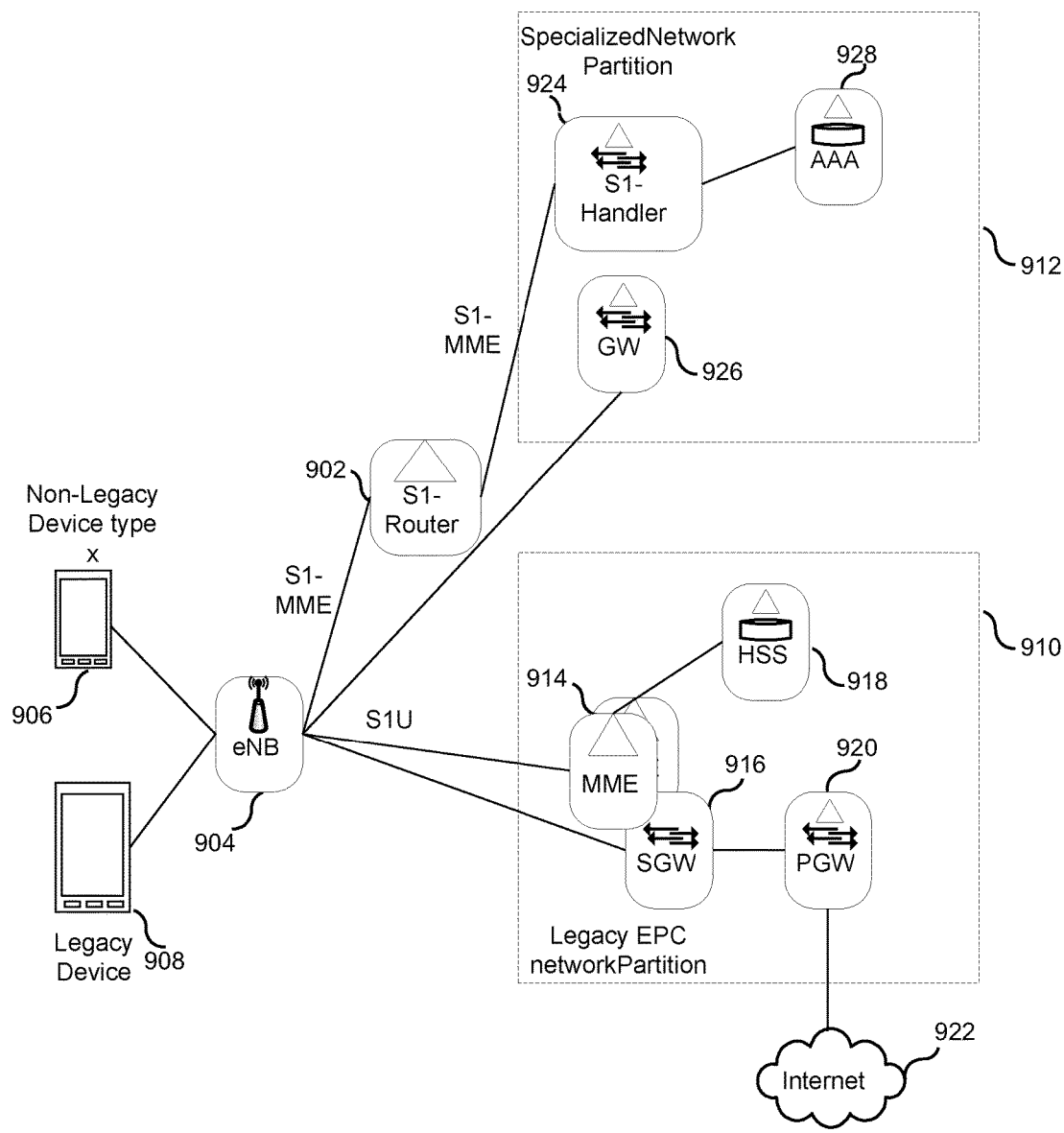

As described above, base partition selection may be performed by a partition selection function, such as a control node, by using existing network standards and messages. FIGS. 7-9 illustrate exemplary embodiments of a partition selection function (and an extended partition selection function in some embodiments) arranged in a network, and the partition selection function (and the extended partition selection function in some embodiments) configured to perform various partition selection mechanisms in the context of LTE access. Although the embodiments described herein are illustrated and described in the context of LTE communication, it may be understood that the embodiments may translate into similar approaches for 3G/HSPA or GSM/EDGE, WiFi, WiMax, UMB, GSM and other types of wireless communications. Further, as noted above, in some embodiments, the partition selection function may be included in an existing node of the network (e.g., eNB).

In some instances of LTE access, the partition selection function may be a new entity and it may be placed at a standardized S1 reference point between the RAN and the core network for selecting a base network partition. The partition selection function may only affect the control plane (e.g., S1-MME). The user plane is not involved, but may be indirectly affected by the partitioning. The partition selection function may use all the information included in the S1AP messages and the NAS signaling between the UE and the core network that is carried by the S1AP messages. The embodiments illustrated in FIGS. 7-9 are various examples of implementing the partition selection function (or an extended partition selection function in some embodiments) at the S1 reference point.

In one embodiment, all S1-MME signaling (including the initial message and subsequent messages) between the RAN and the core network may always be routed via a partition selection function. As shown in FIG. 7, the partition selection function is an S1-Router 702 in network 700. On one side of the network 700, for example, the S1-Router may be in communication with eNB 704, which may be included in the RAN. One or more non-legacy devices 706 and one or more legacy devices 708 are connected to the eNB 704. The non-legacy and legacy devices 706 and 708 may be any wireless communication device, such as mobile devices or UEs, as depicted. On the other side of the network 700, for example, the S1-router 702 may be in communication with legacy EPC network partition 710 and specialized network partition 712. By way of example, legacy EPC network partition 710 includes at least MME 714, SGW, 716, HSS 718, and PGW 720. Further, SGW 716 may be in communication with Internet 722. By way of further example, specialized network partition 712 includes at least S1 Handler 724, GW 726, and Authentication, Authorization, and Accounting (AAA) server 728. Moreover, the eNB 704 may be in communication with the legacy EPC network partition 710 and/or the specialized network partition 712.

As shown by the dashed lines in FIG. 7, all S1-MME signaling (including the initial message and subsequent messages) between the RAN and the core network is routed via the S1-Router 702. In that regard, in some examples, the S1-Router 702 appears to the RAN as a core network MME and to the core network as an eNB. As will be further described below, the S1-Router 702 receives initial attach messages associated with devices 706 and 708 from eNB 704, performs analysis on the partition selection information in the messages, and routes those messages to a node in either the legacy EPC network partition 710 or specialized network partition 712. This embodiment simplifies configuration in instances when there are many base network partitions or many base stations. Further, SCTP connections are established between the RAN and core network nodes that have the possibility to exchange messages. The number of such connections may be the multiplication of the number of involved RAN nodes and the number involved core network nodes. Thus, by arranging the S1-router between the RAN and the core network and configuring all signaling to be routed through the S1-router, the number of connections may be reduced to the nodes that are in RAN and core network.

If an encapsulation layer is used to include the partition ID, and further, NAS signaling message is used, the embodiment based at least in part on FIG. 7 may either be used for all NAS messages or only for the signaling events that carries the partition ID. Before using the encapsulation layer in signaling to the network, the UE needs to know if it is supported (e.g., if the partition selection function is present). The UE can be informed that the partition selection function is present in the network either by broadcast information or by explicit information in the RRC connection establishment signaling sequence, prior to the message where the NAS signaling message is to be included. In this regard, the UE may know whether or not the encapsulation layer is supported. A further aspect involves not informing the UE of the existence of the partition selection function and the encapsulation layer be used only for signaling events that result in a S1AP initial UE message.

In another embodiment, only an S1-AP initial UE message is routed via the partition selection function. In this example, the partition selection function may be referred to as a base network partition selector function (BNPSF). After the BNPSF has identified the base network partition, the signaling may be redirected such that subsequent signaling is sent directly between the RAN node(s) and the core network node(s). In this regard, the BNPSF is initially used to select the base network partition based on the received initial UE message, and the subsequent signaling is performed between an existing RAN node and a core network node associated with the selected base network partition. FIG. 8 is an exemplary illustration of this embodiment.

FIG. 8 illustrates an embodiment of the BNPSF 802 in network 800. On one side of the network 800, for example, the BNPSF 802 may be in communication with eNB 804, which may be included in the RAN. One or more non-legacy devices 806 and one or more legacy devices 808 are connected to the eNB 804. The non-legacy and legacy devices 806 and 808 may be any wireless communication device, such as mobile devices or UEs, as depicted. On the other side of the network 800, for example, the BNPSF 802 may be in communication with legacy EPC network partition 810 and specialized network partition 812. By way of example, legacy EPC network partition 810 includes at least MME 814, SGW, 816, HSS 818, and PGW 820. Further, SGW 816 may be in communication with Internet 822. By way of further example, specialized network partition 812 includes at least a S1 Handler 824, GW 826, and AAA server 828. Moreover, the eNB 804 may be in communication with the legacy EPC network partition 810 and/or the specialized network partition 812.

The redirection of the subsequent signaling may be performed by informing the UE about the identity (e.g., GUTI) to use in further S1-MME signaling. Redirection may also be performed, in other examples, in accordance with NAS message redirection procedures.

In this example, if an encapsulation layer is used to include the partition ID, and further, NAS signaling message is used, the embodiment based at least in part on FIG. 8 may either be used for all NAS messages or only for the signaling events that carries the partition ID. Before using the encapsulation layer in signaling to the network, the UE needs to know if it is supported (i.e., if the partition selection function is present). The UE can be informed that the partition selection function is present in the network either by broadcast information or by explicit information in the RRC connection establishment signaling sequence, prior to the message where the NAS signaling message is to be included. In this regard, the UE may know whether or not the encapsulation layer is supported. A further aspect involves not informing the UE of the existence of the partition selection function, where the encapsulation layer may be used only for signaling events that result in a S1AP initial UE message. A further aspect involves not informing the UE of the existence of the partition selection function and the encapsulation layer be used only for signaling events that result in a S1AP initial UE message.

FIG. 9 is a further embodiment where a standardized EPC is considered to be the default base partition and an "extended" partition selection function is only invoked for devices that require the support of specialized base network partition with specific characteristics. In this example, the responsibilities of partition selection function is considered to be "split up." For instance, a node in the RAN (e.g., eNB) may be considered a partition selection function such that it identifies a node in the standardized EPC and routes the message(s) to that identified node. If information in the message(s) identifies a specialized base network partition, an extended partition selection function is invoked to handle such request. In one example, the extended partition selection function may be referred to as an extended base network partition selector function (EBNPSF) if only S1AP initial UE messages routed through the extended partition selection function. In another example, the extended partition selection function may be referred to as an extended S1-Router if all S1-AP signaling (including subsequent signaling) to the selected specialized base network partition is passed through the extended partition selection function.

FIG. 9 illustrates an embodiment of the extended S1-Router 902 and the EBNPSF (not shown) in network 900. On one side of the network 900, for example, the extended S1-Router 902 may be in communication with eNB 904, which may be included in the RAN. One or more non-legacy devices 906 and one or more legacy devices 908 are connected to the eNB 904. The non-legacy and legacy devices 906 and 908 may be any wireless communication device, such as mobile devices or UEs, as depicted. On the other side of the network 900, for example, the extended S1-Router 902 may be in communication with specialized network partition 912. By way of example, legacy EPC network partition 910 includes at least MME 914, SGW, 916, HSS 918, and PGW 920. Further, SGW 916 may be in communication with Internet 922. By way of further example, specialized network partition 912 includes at least S1 Handler 924, GW 926, and AAA server 928. Moreover, the eNB 904 may be in communication with the legacy EPC network partition 910 and/or the specialized network partition 912.

According to some embodiments, methods for separating the initial UE message to route via the EBNPSF and/or the extended S1-Router 902 may be used. For example, a PLMN identification (ID) outside a range of allowed PLMN IDs is designated as an "escape" PLMN ID and indicates that the attach request requires the use of the EBNPSF 902. This "escape" PLMN ID may be broadcasted as any PLMN ID by the RAN and may be known by the UE such that the UE can indicate the need for the EBNPSF 902. In another example, the UE may indicate the need for the EBNPSF 902 by using a dedicated MMEGI value in the old GUTI parameter associated with the initial UE message that is unique to the target base network partition. In either of these examples, the RAN is not affected, and the ability to separate the core network into network partitions may be introduced without adding various functions to the RAN. Thus, from the perspective of the eNB, the partition selection function may be recognized as any MME.

In another embodiment and as noted above with respect to FIGS. 7 and 8, the partition selection function may use NAS signaling between the UE and the core network to select a network partition and route the initial UE message to that network partition.

In this example, if an encapsulation layer is used to include the partition ID, and further, NAS signaling message is used, the embodiment based at least in part on FIG. 9 may either be used for all NAS messages or only for the signaling events that carries the partition ID. Before using the encapsulation layer in signaling to the network, the UE needs to know if it is supported (i.e., if the partition selection function is present). The UE can be informed that the partition selection function is present in the network either by broadcast information or by explicit information in the RRC connection establishment signaling sequence, prior to the message where the NAS signaling message is to be included.

In this regard, the UE may know whether or not the encapsulation layer is supported. A further aspect involves not informing the UE of the existence of the partition selection function and the encapsulation layer may be used only for signaling events that result in a S1AP initial UE message. A further aspect involves not informing the UE of the existence of the partition selection function and the encapsulation layer be used only for signaling events that result in a S1AP initial UE message.

While FIGS. 7-9 illustrate, in some examples, the partition selection function being separate from the eNB by the S1-MME interface, it should be understood that the partition selection function can be included in an existing network, such as the eNB.

Figure 10:
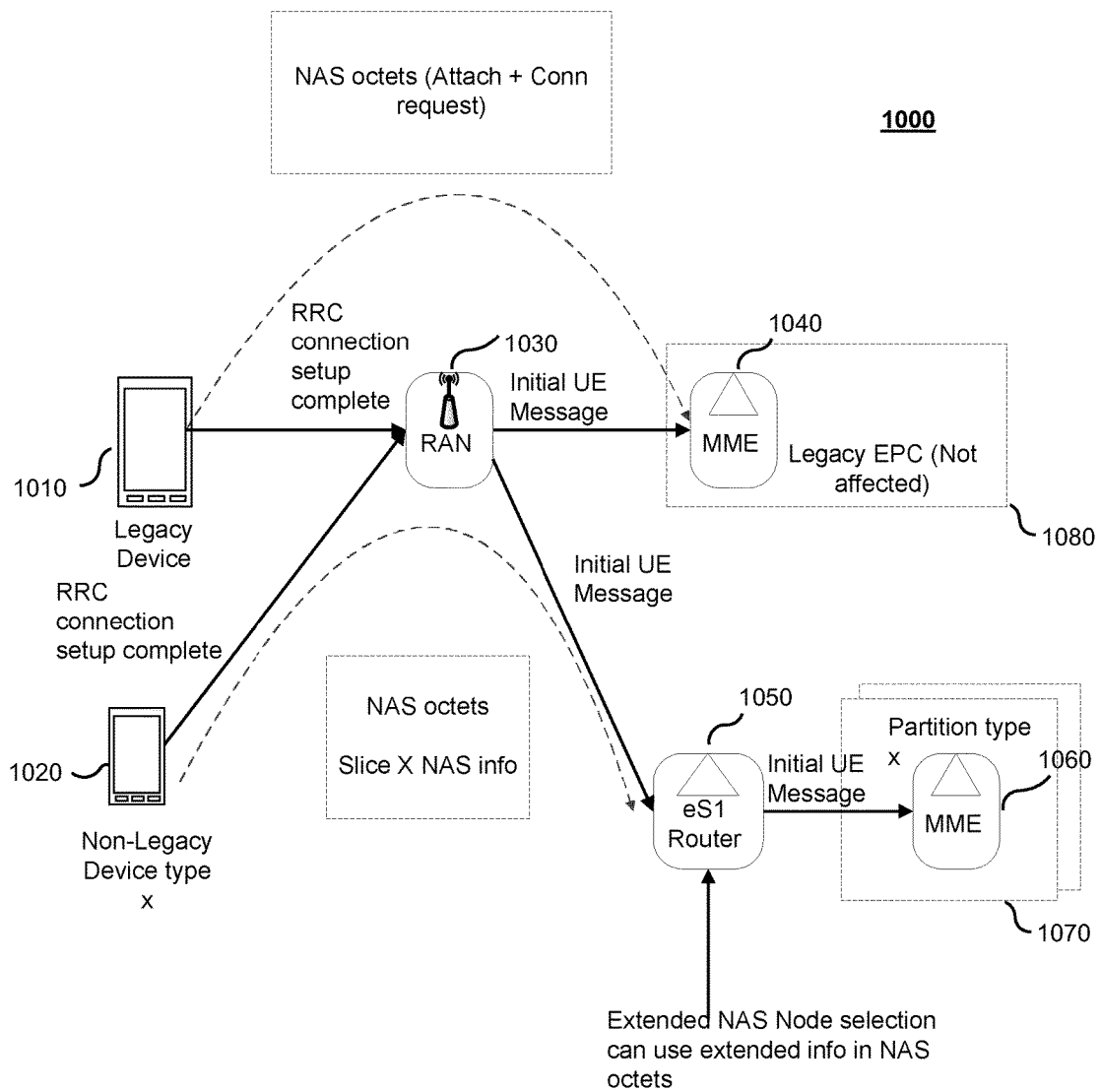

Referring to FIG. 10, an exemplary arrangement of a partition selection function in a network is illustrated during NAS signaling between UEs and the core network. One or more legacy devices 1010 and one or more non-legacy devices 1020 are in communication with RAN 1030, which is, in turn, communicating with MME 1040 in legacy EPC 1080 and extended S1-Router 1050 in a partition type 1070. During normal NAS signaling procedure, the device 1010, for example, may be directly signaling to MME 1040. The device 1020 may also utilize NAS signaling to communicate with the core network, but in a further example, the extended S1-Router 1050 may extract partition selection information from the initial UE message and determine where to route the message. Thus, the message may be routed to MME 1060 in partition type 1070. In that regard, the NAS signaling may be extended to serve the needs of a specialized network partition. This may be done by extending an existing standardized NAS message or adding new NAS message for the purpose of network partition selection.

Figure 11:
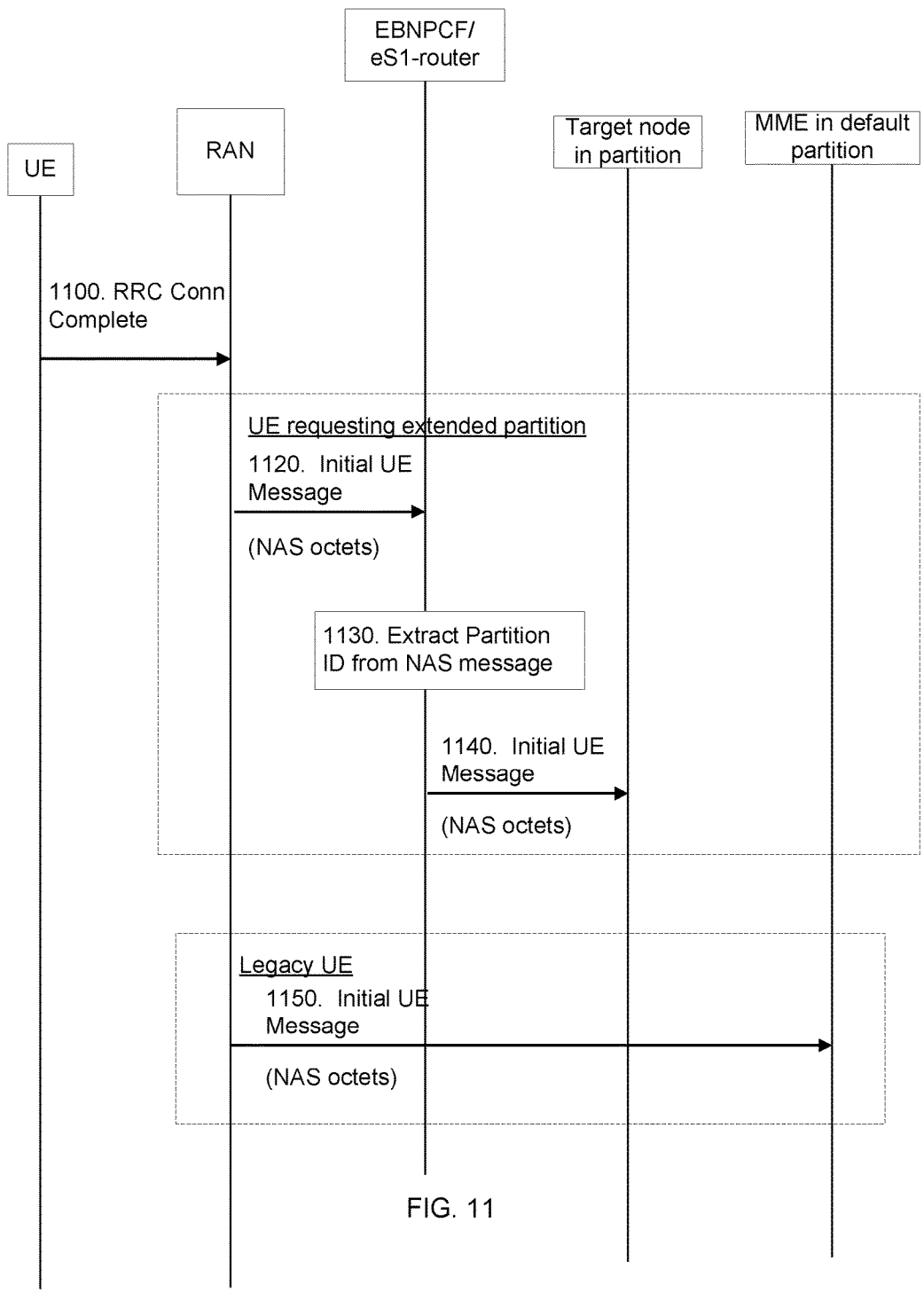
FIGS. 11-12 are exemplary illustrations of a signaling sequence diagram in accordance with exemplary embodiments.
Figure 12:
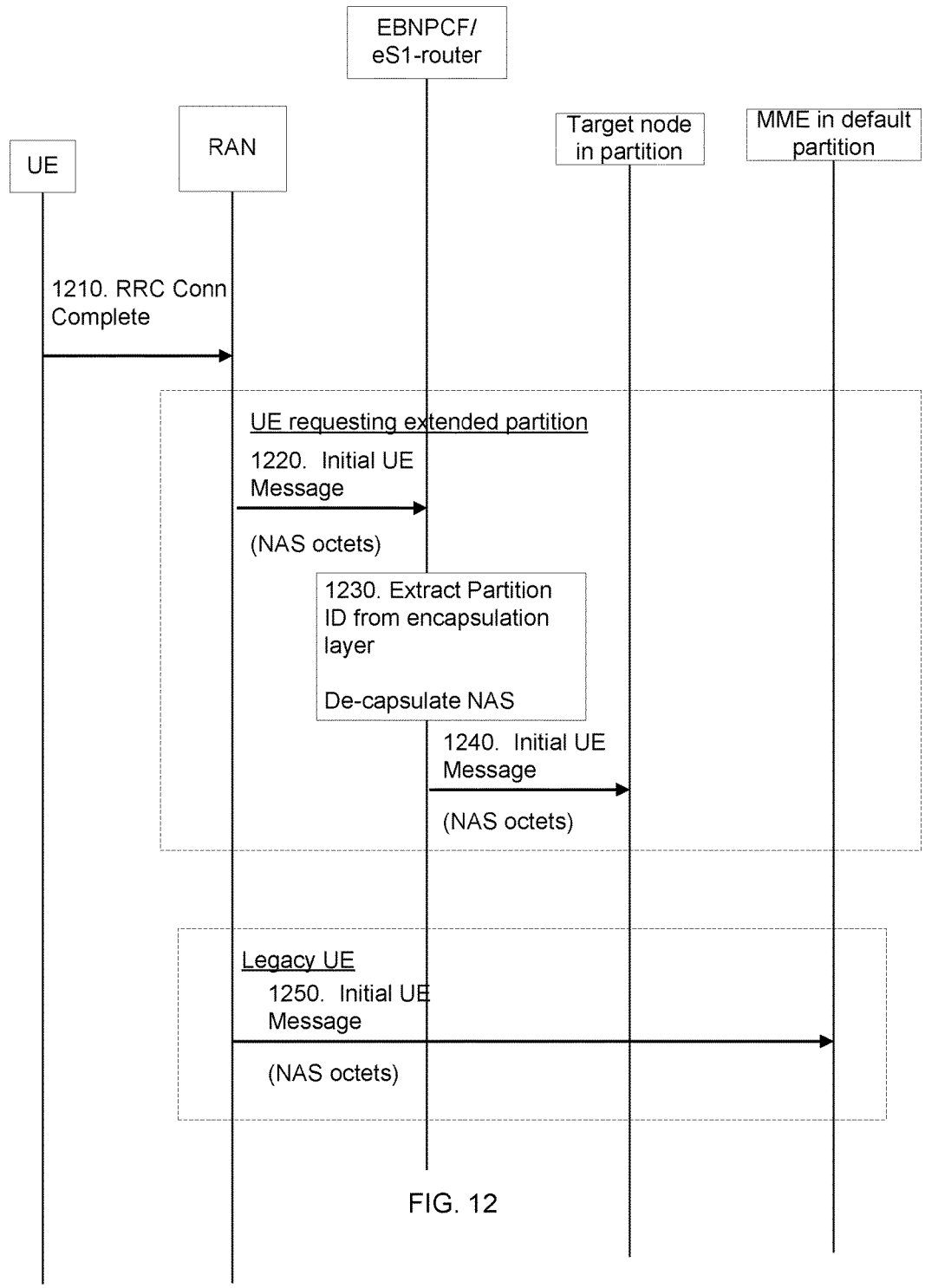

FIGS. 11-12 illustrate exemplary signaling diagrams in the context of NAS signaling. As illustrated in FIG. 11, RAN receives an RRC connection complete message 1110 from a UE requesting an extended network partition. Then, an extended S1-Router receives an initial UE message 1120 from the RAN, where the extended S1-Router can extract partition selection information (e.g., partition ID) from the NAS message at block 1130. Based on the partition selection information, the extended S1-Router selects a target node in a particular network partition and sends the message 1140 to the target node. Meanwhile, the initial UE message 1150 of the legacy UE is sent to the MME in a default partition from the RAN.

In FIG. 12, the NAS message is included, in one embodiment, in an encapsulation layer. As shown, RAN receives an RRC connection complete message 1210 from a UE requesting an extended network partition. Then, an extended S1-Router receives an initial UE message 1220 from the RAN, where the extended S1-Router can extract partition selection information (e.g., partition ID) from the encapsulation layer and also de-capsulate the NAS message at block 1230. Based on the partition selection information, the extended S1-Router selects a target node in a particular network partition and sends the message 1240 to the target node. Meanwhile, the initial UE message 1250 of the legacy UE is sent to the MME in a default partition from the RAN.

Figure 13:
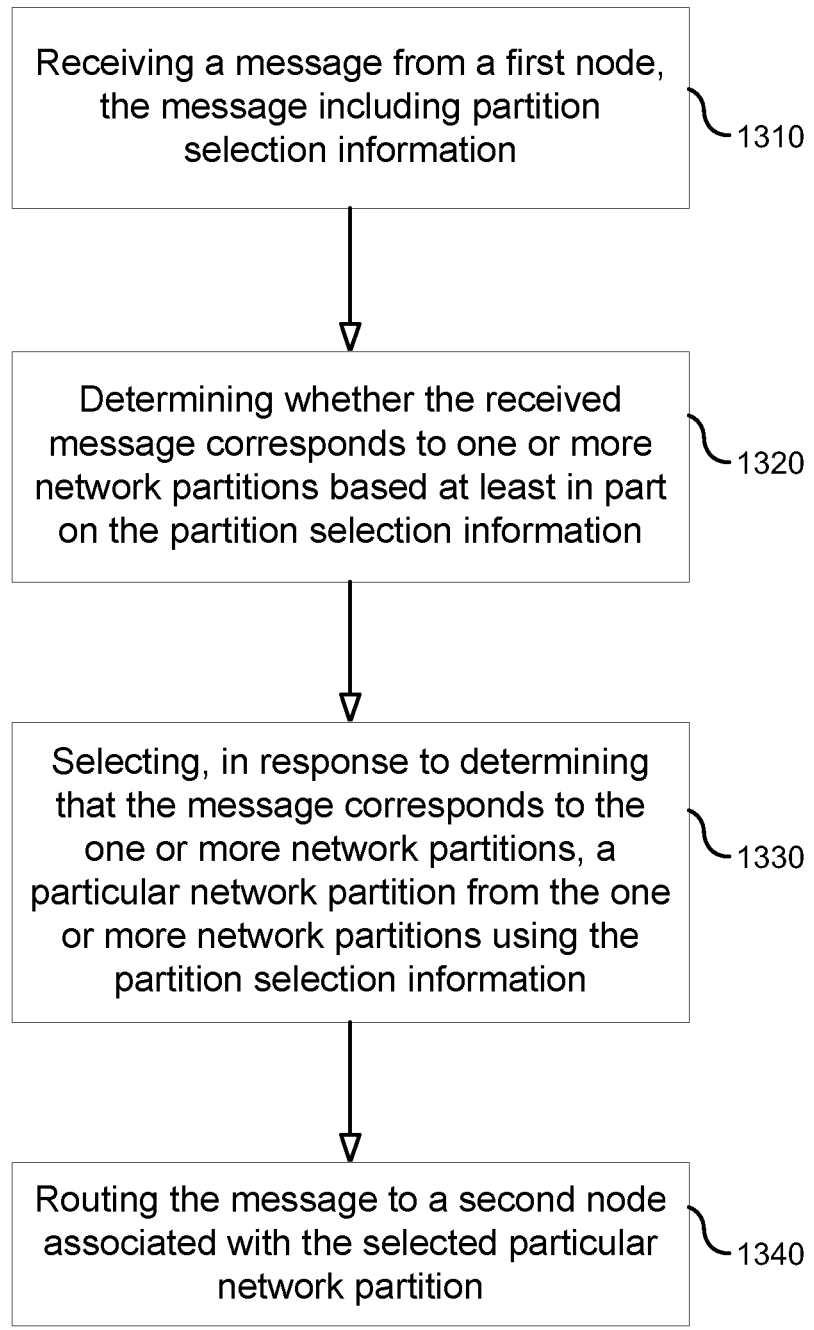
FIGS. 13 and 14 are exemplary illustrations of a flow chart of a process performed by a partition selection function.
Figure 14:
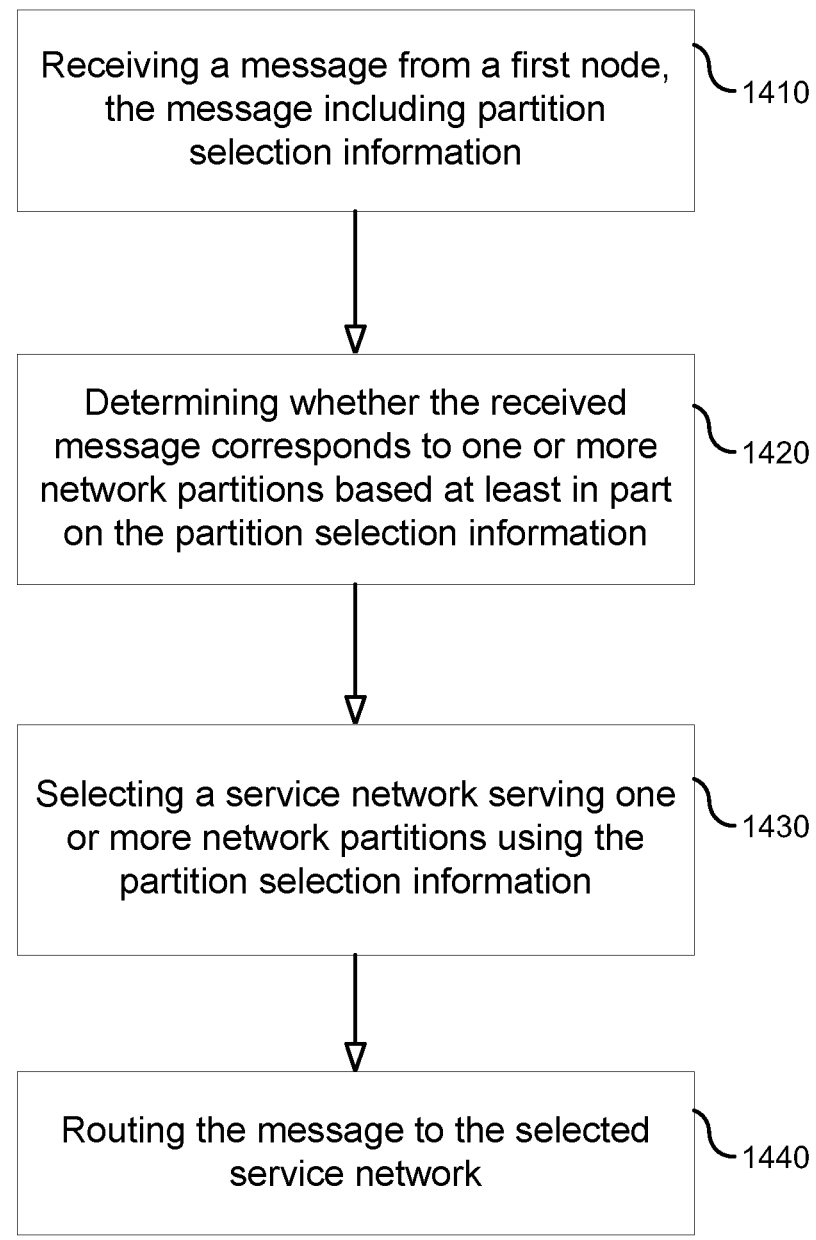

FIGS. 13-14 are exemplary flow charts of a process performed by a partition selection function in accordance with embodiments of the disclosure. FIG. 13 illustrates an example process 1300 in which a partition selection function, such as a control node, selects a particular network partition to route a message using the partition selection information included in the message. FIG. 14 illustrates an example process 1400 in which a partition selection function, such as a control node, selects a service network serving one or more network partitions to route a message using the partition selection information included in the message. In both examples, the control node may be an S1 router and the message may be an initial UE attach request message.

As illustrated in FIG. 13, the control node at step 1310 receives a message from a first node and the message includes partition selection information. In some embodiments, the first node may be a node associated with the RAN and, as described above, the partition selection information may include information such as partition IDs associated with different network partitions. At step 1320, the control node determines whether the received message corresponds to one or more network partitions based at least in part on the partition selection information. Further, at step 1330, the control node selects, in response to determining that the message corresponds to the one or more network partitions, a particular network partition from the one or more network partitions using the partition selection information. Thus, in some instances, if the control node determines that there are more than one network partitions corresponding to the message based on the partition selection information, the control node selects an appropriate network partition using the partition selection information. And the control node, at step 1340, routes the message to a second node associated with the selected particular network partition.

FIG. 14 shows at step 1410 the control node receiving a message from a first node and the message including partition selection information. As noted above with respect to FIG. 13, the first node may be associated with the RAN and the partition selection information may include information such as partition IDs associated with different network partitions. The partition selection information may also include, in some examples, information with respect to service networks, such as home service networks or enterprise networks. At step 1420, the control node determines whether the received message corresponds to one or more network partitions based at least in part on the partition selection information. At step 1430, the control node selects a service network that may be serving one or more network partitions using the partition selection information. In this example, the control node may have determined that the service network was the appropriate target destination given the information it received in the partition selection information. In that regard, the control node may still route the message to one or more appropriate network partitions without effectively "knowing" information regarding the network partitions associated with the selected network (e.g., via a table look-up). At step 1440, the control node routes the message to the selected service network.

Figure 15:
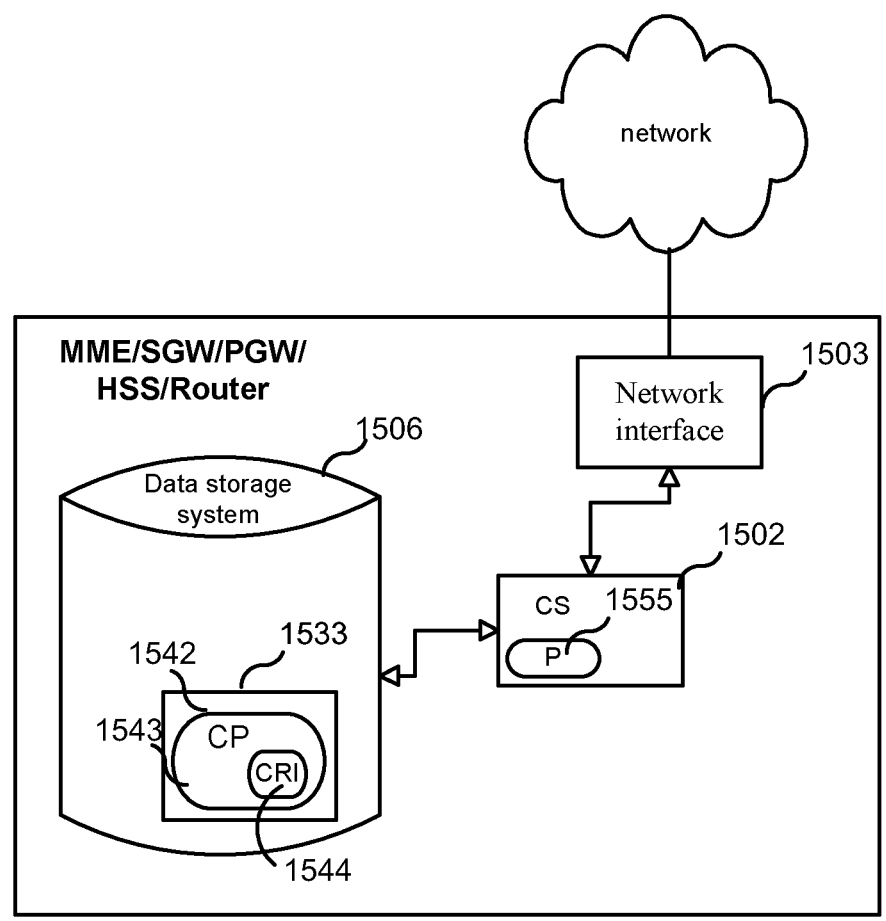
FIG. 15 illustrates an exemplary control node.

FIG. 15 is a block diagram of an embodiment of a control node (e.g., MME, SGW, PGW, HSS, router). As shown in FIG. 15, the control node may include or consist of: a computer system (CS) 1502, which may include one or more processors 1555 (e.g., a general purpose microprocessor) and/or one or more circuits, such as an application specific integrated circuit (ASIC), field-programmable gate arrays (FPGAs), a logic circuit, and the like; a network interface 1503 for use in connecting the control node to a network; and a data storage system 1506, which may include one or more non-volatile storage devices and/or one or more volatile storage devices (e.g., random access memory (RAM)). In embodiments where the control node includes a processor 1555, a computer program product (CPP) 1533 may be provided. CPP 1533 includes or is a computer readable medium (CRM) 1542 storing a computer program (CP)

1543 comprising computer readable instructions (CRI) 1544. CRM 1542 is a non-transitory computer readable medium, such as, but not limited, to magnetic media (e.g., a hard disk), optical media (e.g., a DVD), solid state devices (e.g., random access memory (RAM), flash memory), and the like. In some embodiments, the CRI 1544 of computer program 1543 is configured such that when executed by computer system 1502, the CRI causes the control node to perform steps described above (e.g., steps described above with reference to the flow charts and message flows shown in the drawings). In other embodiments, the control node may be configured to perform steps described herein without the need for a computer program. That is, for example, computer system 1502 may consist merely of one or more ASICs. Hence, the features of the embodiments described herein may be implemented in hardware and/or software.

Figure 16:
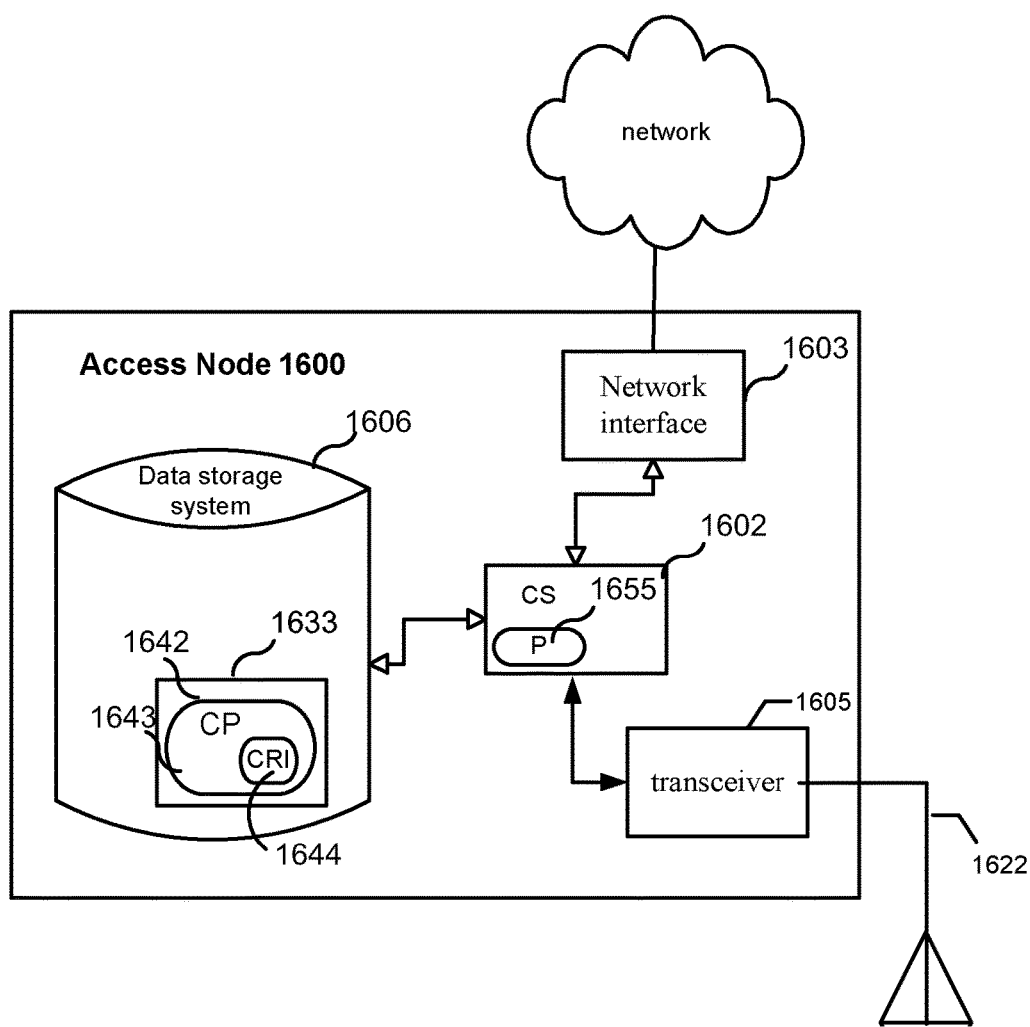
FIG. 16 illustrates an exemplary access node.

FIG. 16 illustrates a block diagram of an exemplary access node, such as node 504 shown in FIG. 5. As shown in FIG. 16, the access node 1600 may include: a data processing system 1602, which may include one or more microprocessors and/or one or more circuits, such as an application specific integrated circuit (ASIC), field-programmable gate arrays (FPGAs), and the like; a network interface 1603; a transceiver 1605, and a data storage system 1606, which may include one or more non-volatile storage devices and/or one or more volatile storage devices (e.g., random access memory (RAM)). According to some embodiments, the data processing system 1602 may comprise a control unit used for selection of transmission parameters.

In embodiments where data processing system 1602 includes a microprocessor, computer readable program code (CRPC) 1643 may be stored in a computer readable medium, such as, but not limited, to magnetic media (e.g., a hard disk), optical media (e.g., a DVD), memory devices (e.g., random access memory), and the like. In some embodiments, computer readable program code is configured such that when executed by a processor, the code causes the data processing system 1602 to perform steps described above (e.g., steps described above with reference to the flow charts shown in FIGS. 13 and 14). In other embodiments, the access node 1600 is configured to perform steps described herein without the need for code. That is, for example, data processing system 1602 may consist merely of one or more ASICs. Hence, the features of the embodiments described herein may be implemented in hardware and/or software. For example, in particular embodiments, the functional components of the base station described above may be implemented by data processing system 1602 executing computer instructions, by data processing system 1602 operating independent of any computer instructions, or by any suitable combination of hardware and/or software.

Figure 17:
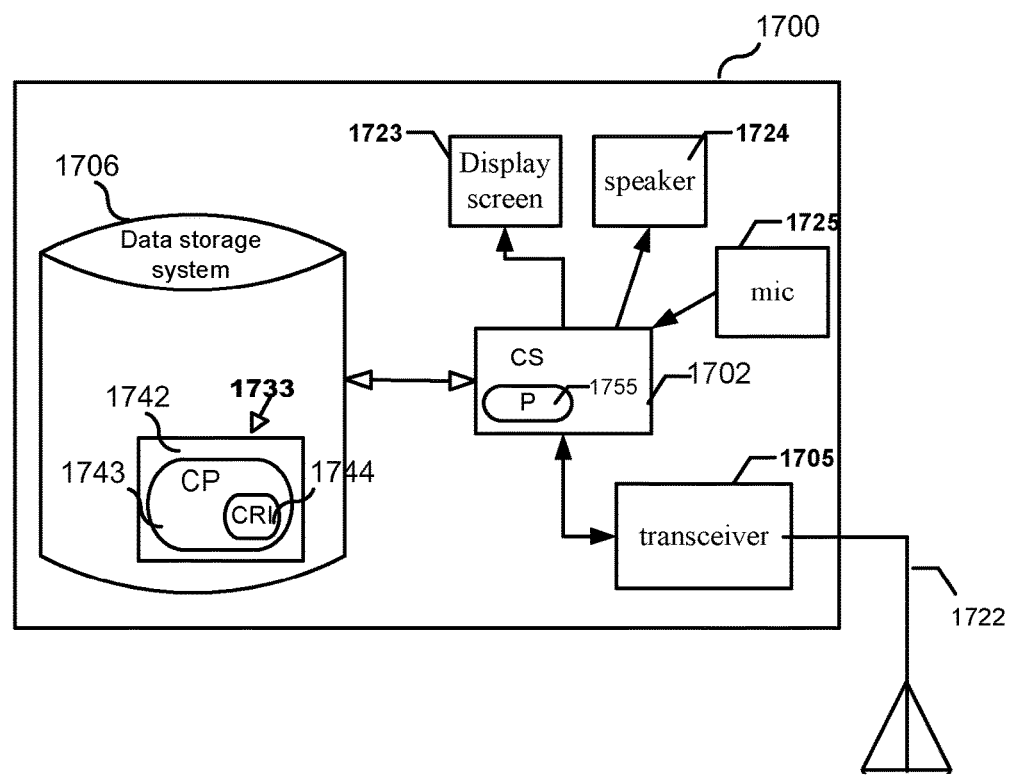
FIG. 17 illustrates and exemplary wireless device.

FIG. 17 is a block diagram of a wireless communication device 1700, such as a UE, according to some embodiments. As shown in FIG. 17, UE may include or consist of: a computer system (CS) 1702, which may include one or more processors 1755 (e.g., a general purpose microprocessor) and/or one or more circuits, such as an application specific integrated circuit (ASIC), field-programmable gate arrays (FPGAs), a logic circuit, and the like; a transceiver 1705, coupled to an antenna, 1722 for transmitting and receiving data wireless; and a data storage system 1706, which may include one or more non-volatile storage devices and/or one or more volatile storage devices (e.g., random access memory (RAM)). In embodiments where UE includes a processor 1755, a computer program product (CPP) 1733 may be provided. CPP 1733 includes or is a computer readable medium (CRM) 1742 storing a computer program (CP) 1743 comprising computer readable instructions (CRI) 1744. CRM 1742 is a non-transitory computer readable medium, such as, but not limited, to magnetic media (e.g., a hard disk), optical media (e.g., a DVD), solid state devices (e.g., random access memory (RAM), flash memory), and the like. In some embodiments, the CRI 1744 of computer program 1743 is configured such that when executed by computer system 1702, the CRI causes the UE to perform steps described above (e.g., steps described above with reference to the flow charts and message flows shown in the drawings). In other embodiments, UE may be configured to perform steps described herein without the need for a computer program. That is, for example, computer system 1702 may consist merely of one or more ASICs. Hence, the features of the embodiments described herein may be implemented in hardware and/or software. As shown in FIG. 17, UE may include: a display screen 1723, a speaker 1724, and a microphone 1725 ("mica"), all of which are coupled to CS 1702.

An additional embodiment involves WiFi access, specifically EAP authentication messages used in the 802.1x standard. In this example, a new EAP information element may carry the partition ID. Another example is to reuse existing information elements. For instance, including the Network Access Identifier (NAI) with the partition ID. Once the network side has retrieved the partition ID, it may be used to select a node in a network partition.

The embodiments described herein provide several advantages. One advantage is that it is possible to support new use case or service specific optimizations, architecture, and/or protocol enhancements while still supporting existing users via existing network functions. This allows for a smooth introduction of new features in an existing network system (e.g., improved TTM/TTC). Further, the new capabilities may be made possible, where the existing RAN signaling is extended in a backward compatible way.

Further, another advantage is that it is possible to use the same RAN for basic MBB services and for specialized network partitions in a simultaneous manner. By way of example, these specialized network partitions may be used for: (i) supporting devices with different mobility requirements, e.g., very fast moving devices and/or stationary devices; and (ii) allowing extreme number of machine-to-machine devices to be used in parallel with normal MBB usage, e.g., by limiting the signaling frequencies.

Yet a further advantage is that partitioning can be accomplished with the standardized mechanisms. In that regard, network partitioning can be generalized as not requiring the supported users to be registered as subscribers to the operator of the RAN and/or default core network. By way of example, this may be used for: (i) serving a particular enterprise without the need to define all enterprise users in the Home Subscriber Server (HSS) used for the public MBB service; and (ii) using a non-SIM based authentication scheme.

Although terminology from LTE has been used in this disclosure to exemplify the exemplary embodiments, one of ordinary skill in the art would understand this as not limiting the scope of the present embodiments to only the aforementioned system. Other wireless systems, including 3GPP, 3GPP HSP, LTE-A, WiMax, UMB and GSM, may also benefit from exploiting the ideas covered within this disclosure.

Furthermore, the terminology such as NodeB and UE are non-limiting and does in particular do not imply a certain hierarchical relation between the two; in general "NodeB"

could be considered as device 1 and "UE" device 2, and these two devices communicate with each other over some radio channel.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that, although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or non-transitory computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the appended examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the following examples of embodiments and their equivalents, and shall not be restricted or limited by the foregoing detailed description.

ABBREVIATIONS

3GPP 3rd Generation Partnership Project
AAA Authentication, Authorization, Accounting Server BSS Base Station Subsystem
DÉCOR Dedicated Core Networks
eNB E-UTRAN Node B
E-UTRAN Evolved Universal Terrestrial Radio Access Network
EPC Evolved Packet Core
EPS Evolved Packet System
GERAN GSM/EDGE Radio Access Network
GW Gateway
HSS Home Subscriber Server
LTE Long Term Evolution
MBB Mobile Broadband
MME Mobility Management Entity
MSC Mobile Switching Center
MTC Machine Type Communication
NAS Non-access Stratum
OSS Operation Support Systems
PCRF Policy and Charging Rules Function
PGW Packet Data Network (PDN) Gateway
PLMN Public Land Mobile Network
RAN Radio Access Network
RLC Radio Link Control
RNC Radio Network Controller
RRC Radio Resource Control
SGW Serving Gateway
TDD Time Division Duplex
UE User Equipment
UTRAN Universal Terrestrial Radio Access Network
VoLTE Voice over LTE
WCD Wireless Communication Device
WLAN Wireless Local Area Network

The invention claimed is:

1. A method, the method comprising:
receiving, at a control node, a message from a base station, wherein the message includes partition selection information and the base station obtained the message from a user equipment (UE) as a part of a network registration process for registering the UE;
selecting a network partition from a set of two or more network partitions using the partition selection information that was included in the message obtained from the UE as a part of the network registration process for registering the UE; and
routing the message to a second node associated with the selected network partition, wherein
the set of two or more network partitions includes a first network partition and a second network partition, and
the first and second network partitions support different services and/or handle different users.

2. The method of claim 1, wherein the partition selection information includes an identifier (ID), wherein the ID is at least one of a partition ID or a Public Land Mobile Network (PLMN) ID.

3. The method of claim 2, wherein
the partition selection information includes the partition ID,
the partition ID identifies a type of partition, and
the type of partition is at least one of a Mobile Broadband (MBB), Machine Type Communication (MTC), or media distribution.

4. The method of claim 1, wherein the partition selection information is a communication device type identifier that identifies a communication device type.

5. The method of claim 1, wherein each network partition of the set of two or more network partitions is a dedicated core network within a public land mobile network (PLMN).

6. The method of claim 1, wherein the message is an initial attach message transmitted by user equipment (UE) or a Radio Resource Control (RRC) message transmitted by the UE.

7. The method of claim 1, wherein the set of two or more network partitions includes a first Machine Type Communication (MTC) partition, a second MTC partition, a Mobile Broadband (MBB) partition, and a Voice over LTE (VoLTE) partition.

8. The method of claim 1, wherein the message is a non-access stratum (NAS) message sent on an encapsulation layer.

9. The method of claim 1, wherein the second node is a mobility management node configured to perform mobility management functions.

10. The method of claim 9, wherein the mobility management node is a 3GPP Mobility Management Entity (MME).

11. The method of claim 1, wherein the control node is placed at a Long-Term Evolution (LTE) standardized reference point between a Radio Access Network (RAN) and a core network.

12. The method of claim 1, wherein the control node is a node associated with Radio Access Network (RAN).

13. The method of claim 12, wherein the node associated with the RAN is an existing node located in the RAN.

14. The method of claim 1, wherein the step of routing the message to the second node is performed only on an initial message.

15. The method of claim 1, wherein the step of routing the message to the second node is performed only when the partition selection information of the received message indicates that the control node is required to route the message.

16. A method, the method comprising:
receiving, at a control node, a message from a base station, wherein the message includes partition selection information and the base station obtained the message from a user equipment (UE) as a part of a network registration process for registering the UE;
selecting a service network from a set of two or more service networks using the partition selection information included in the message obtained from the UE; and
routing the message to the selected service network, wherein
the set of two more service networks includes a first service network and a second service network,
the first service network is associated with a first network partition,
the second service network is associated with a second network partition, and
the first and second network partitions support different services and/or handle different users.

17. The method of claim 16, wherein the partition selection information includes information associated with the selected service network serving one or more network partitions without unique information associated with the one or more network partitions served by the service network.

18. A control node, comprising:
one or more processors; and
a non-transitory computer readable medium coupled to the one or more processors, said non-transitory computer readable medium containing instructions executable by the one or more processors, whereby the control node is operative to:

receive a message transmitted by a user equipment (UE) as part of a process for registering the UE with a network, the message including partition selection information;
select a network partition from a set of two or more network partitions using the partition selection information included in the message transmitted by the UE; and
route the message to a second node associated with the selected network partition, wherein
the set of two or more network partitions includes a first network partition and a second network partition, and
the first and second network partitions support different services and/or handle different users.

19. The control node of claim 18, wherein the partition selection information includes an identifier (ID), wherein the ID is at least one of a partition ID or a Public Land Mobile Network (PLMN) ID.

20. The control node of claim 19, wherein
the partition ID identifies a type of partition, and
the type of partition is at least one of a Mobile Broadband (MBB), Machine Type Communication (MTC), or media distribution.

21. The control node of claim 19, wherein
the partition ID is a unique identification associated with a particular partition or
the partition ID identifies a type of a network terminal.

22. The control node of claim 18, wherein each network partition of the set of two or more network partitions is a dedicated core network within a public land mobile network (PLMN).

23. The control node of claim 18, wherein the message is an initial attach message of a user equipment (UE) or a Radio Resource Control (RRC) message.

24. The control node of claim 18, wherein the set of two or more network partitions includes a first Machine Type Communication (MTC) partition, a second MTC partition, a Mobile Broadband (MBB) partition, and a Voice over LTE (VoLTE) partition.

25. The control node of claim 18, wherein the message is a non-access stratum (NAS) message sent on an encapsulation layer.

26. The control node of claim 25, wherein the control node is further operative to de-capsulate the NAS message prior to routing the message to the second node.

27. The control node of claim 18, wherein the control node is placed at a Long-Term Evolution (LTE) standardized reference point between a Radio Access Network (RAN) and a core network.

28. The control node of claim 18, wherein the control node is a node associated with a Radio Access Network (RAN).

29. The control node of claim 28, wherein the node associated with the RAN is an existing node located in the RAN.

30. The control node of claim 18, wherein the control node is operative to route all messages including an initial message and subsequent messages.

31. The control node of claim 18, wherein the control node is operative to route only an initial message.

32. The control node of claim 18, wherein the control node is operative to route the message to the second node only when the partition selection information of the received message indicates that the control node is required to route the message.

33. A control node, comprising:
one or more processors; and
a non-transitory computer readable medium coupled to the one or more processors, said non-transitory computer readable medium containing instructions executable by the one or more processors, whereby the control node is operative to:
receive a message transmitted by a user equipment (UE) as part of a process for registering the UE with a network, the message including partition selection information;
select a service network from a set of two or more service networks using the partition selection information included in the message transmitted by the UE; and
route the message to the selected service network, wherein
the set of two or more service networks includes a first service network and a second service network,
the first service network is associated with a first network partition,
the second service network is associated with a second network partition, and
the first and second network partitions support different services and/or handle different users.

34. The control node of claim 33, wherein the partition selection information includes information associated with the selected service network serving one or more network partitions without unique information associated with the one or more network partitions served by the service network.

* * * * *

UNITED STATES PATENT AND TRADEMARK OFFICE
CERTIFICATE OF CORRECTION

PATENT NO. : 10,299,199 B2  
APPLICATION NO. : 15/564506  
DATED : May 21, 2019  
INVENTOR(S) : Basilier et al.

Page 1 of 2

It is certified that error appears in the above-identified patent and that said Letters Patent is hereby corrected as shown below:

In the Drawings

In Fig. 11, Sheet 11 of 17, Line 1, delete "1100." and insert -- 1110. --, therefor.

In the Specification

In Column 1, Line 44, delete "one more" and insert -- one or more --, therefor.

In Column 2, Line 25, delete "users." and insert -- users). --, therefor.

In Column 2, Line 45, delete "on PLMN." and insert -- a PLMN. --, therefor.

In Column 2, Line 48, delete "(MEE, SGW)" and insert -- (MME, SGW) --, therefor.

In Column 4, Line 41, delete "and exemplary" and insert -- an exemplary --, therefor.

In Column 7, Line 3, delete "MBB partition 602(a)" and insert -- MBB partition (602A) --, therefor.

In Column 7, Line 8, delete "OSS node 622." and insert -- OSS node 626. --, therefor.

In Column 7, Lines 10-11, delete "network 632. The first MTC partition 502C" and insert -- cloud 632. The first MTC partition 602C --, therefor.

In Column 7, Line 12, delete "second MTC partition 502D" and insert -- second MTC partition 602D --, therefor.

In Column 8, Line 14, delete "configure" and insert -- configured --, therefor.

In Column 10, Line 20, delete "SGW, 716," and insert -- SGW 716, --, therefor.

Signed and Sealed this  
Second Day of March, 2021

Drew Hirshfeld  
*Performing the Functions and Duties of the*  
*Under Secretary of Commerce for Intellectual Property and*  
*Director of the United States Patent and Trademark Office*

In Column 11, Line 26, delete "SGW, 816," and insert -- SGW 816, --, therefor.

In Column 12, Lines 25-26, delete "SGW, 916," and insert -- SGW 916, --, therefor.

In the Claims

In Column 20, Line 25, in Claim 12, delete "with Radio" and insert -- with a Radio --, therefor.

In Column 20, Line 47, in Claim 16, delete "two more" and insert -- two or more --, therefor.